(12) United States Patent
Raghuwanshi et al.

(10) Patent No.: US 12,271,845 B2
(45) Date of Patent: Apr. 8, 2025

(54) SYSTEMS AND METHODS FOR SMART ELECTRONIC FORM MANAGEMENT WITH CONDITION TRACKING

(71) Applicant: Oracle International Corporation, Redwood Shores, CA (US)

(72) Inventors: Ravindra Raghuwanshi, Guna Madhya Pradesh (IN); Shreeshail Ganiger, Bangalore Karnataka (IN); Amy Lee, Flower Mount, TX (US); Roshni Ramdasan Kaithavalappil, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 252 days.

(21) Appl. No.: 17/693,045

(22) Filed: Mar. 11, 2022

(65) Prior Publication Data

US 2023/0289675 A1 Sep. 14, 2023

(51) Int. Cl.
G06Q 10/0631 (2023.01)
G06F 40/174 (2020.01)
G06Q 10/0633 (2023.01)

(52) U.S. Cl.
CPC ... *G06Q 10/063114* (2013.01); *G06F 40/174* (2020.01); *G06Q 10/06313* (2013.01); *G06Q 10/0633* (2013.01)

(58) Field of Classification Search
None
See application file for complete search history.

(56) References Cited

U.S. PATENT DOCUMENTS

| | | |
|---|---|---|
| 8,412,599 B2 | 4/2013 | Saiu et al. |
| 2002/0178077 A1 | 11/2002 | Katz et al. |
| 2003/0033179 A1 | 2/2003 | Katz et al. |
| 2003/0189600 A1 | 10/2003 | Gune et al. |
| 2007/0179790 A1 | 8/2007 | Leitch et al. |
| 2008/0077530 A1* | 3/2008 | Banas ............... G06Q 10/06 705/50 |

(Continued)

OTHER PUBLICATIONS

"IEEE Draft Standard for Software and systems engineering—Requirements for managers of user documentation," in IEEE P26511/D1, Apr. 2011 , vol., No., pp. 1-57, Apr. 28, 2011. (Year: 2011).*

*Primary Examiner* — Stephanie Z Delich
(74) *Attorney, Agent, or Firm* — MUGHAL GAUDRY & FRANKLIN PC

(57) ABSTRACT

An electronic form management system is programmed to: (i) provide a planning UI configured to enable a planning user to assign conditions of approval to a planning application during a planning phase, each condition of approval includes a completion status and one or more conditions to which a permit application is subject during a permitting phase; (ii) provide a permitting UI configured to enable a permitting user to administer the permit application during the permitting phase; (iii) update a completion status of at least one condition of approval data element of the plurality of conditions of approval data elements in response to a condition being satisfied; (iv) calculate an aggregate completion status of a set of conditions of approval data elements; and (v) cause to be displayed at least one graphical interface element representing the calculated aggregate completion status of the set of conditions of approval data elements.

21 Claims, 16 Drawing Sheets

(56) References Cited

U.S. PATENT DOCUMENTS

2010/0223623 A1* 9/2010 Strong .................. G06Q 40/08
                                                718/105
2011/0191217 A1   8/2011 Saiu et al.
2018/0239959 A1*  8/2018 Bui ........................ G06F 16/93

* cited by examiner

Conditions of Approval Library

SEARCH 🔍

SELECTIONS (0)

| Conditions of Approval | Category | Subcategory | Type | Compliance Period |
|---|---|---|---|---|
| Compliance with Other Requirements<br>The project applicant shall comply with all other applicable federal, state, regional, and ....<br>SHOW MORE | General Conditions | Administrative | Standard | • Permit Application |
| Effective Date, Expirations, Extensions, and Extinguishments<br>This approval shall become effective immediately, ....<br>SHOW MORE | General Conditions | Administrative | Standard | • Permit Application<br>• Permit Issuance |
| Minor and Major Changes<br>Minor changes to the approved project, plans, Conditions, facilities, or use may be approved administratively ....<br>SHOW MORE | General Conditions | Administrative | Standard | • Certificate of Occupancy Inspection<br>• Permit Application<br>• Permit Issuance<br>• Plan Review<br>• Use or Operation |

ADD SELECTED   CANCEL

FIG. 3C

Add Condition of Approval

| Format ▼ | Font ▼ | Size ▼ | B *I* U | ≡ ≡ ≡ |

/* Add/Edit Condition of Approval Description Here */

Status
[Applied ▼]

Condition Type
[Custom ▼]

Category
[ ▼]

Subcategory
[ ▼]

Compliance Period
☐ Permit Application
☐ Plan Review
☐ Permit Issuance
☐ Inspection
☐ Certificate of Occupancy
☐ Use or Operation

[SAVE] [SAVE AND NEW] [CANCEL]

Link Transactions

APPLICATIONS | CASES

Transactions

[ADD SELECTED]

| | Application | Classification | Submission Date | Property | Description |
|---|---|---|---|---|---|
| ☐ | Building Permit<br>BP-2021-0033<br>Pending | Permits | | 1234 Sesame St.<br>ALAMEDA | Rebuild 300 SF Fire damaged garage. |
| ☐ | Conditional Use Permit<br>CUP-2021-0037<br>Plan Review | Planning and Zoning | 9/28/21 | 1234 Sesame St.<br>ALAMEDA | Kitchen Renovation. Demo existing cabinets, countertop, sink, appliances and non-load bearing wall. Remove an existing window, interior dry-wall tape and texture.... |
| ☑ | Conditional Use Permit<br>CUP-2021-0039<br>In Process | Planning and Zoning | 11/1/21 | 1234 Sesame St.<br>ALAMEDA | Convert existing detached garage into studio living space with 1 bathroom and kitchenette – Conditional use with expedited service. |
| ☐ | Conditional Use Permit<br>CUP-2021-0035<br>In Process | Planning and Zoning | 9/28/21 | 1234 Sesame St.<br>ALAMEDA | Remove existing detached garage, build new attached garage, remodel bathroom and kitchen, build new addition, includes plumbing, electrical, and HVAC. |
| ☐ | Conditional Use Permit<br>CUP-2021-0040<br>In Process | Planning and Zoning | 9/28/21 | 1234 Sesame St.<br>ALAMEDA | Revision to fire alarm plans as a result of new interior walls in lower level. |

FIG. 5B

Conditions of Approval

Permit Application

○ Apply All → Apply to Current Application

| Conditions of Approval | Compliance Period |
|---|---|
| Signed Copy of the Approval/Conditions A copy of the Approval letter and Conditions shall be signed by the project applicant, attached to each set of permit plans submitted to the appropriate City agency for the project, and made available for review at the project job site at all times. [SHOW MORE] | • Permit Application |
| Effective Date, Expiration, Extensions and Extinguishments This Approval shall become effective immediately, unless the Approval is appealable, in which case the Approval shall become effective in ten calendar days unless an appeal is filed. Unless a different termination date is prescribed, this Approval shall expire no later than expiration on …. [SHOW MORE] | • Permit Application • Permit Issuance |
| Minor and Major Changes Minor changes to the approved project, plans, Conditions, facilities, or use may be approved administratively by the Director of City Planning. Major changes to the approved project, plans, Conditions, facilities, or use shall be reviewed by the Director of City Planning to determine whether such …. [SHOW MORE] | |

[SAVE] [CANCEL]

FIG. 5D

Reorder Conditions of Approval

Select a record and use the icons or simply drag and drop to a new position in the list.

| Conditions of Approval | Type | Category | Subcategory |
|---|---|---|---|
| Effective Date, Expiration, Extensions, and Extinguishment<br>This Approval shall become effective immediately, unless the Approval is ... | Standard | General Conditions | Administrative |
| Signed Copy of the Approval/Conditions<br>A copy of the Approval letter and Conditions shall be signed by the project .... | Standard | General Conditions | Administrative |
| Compliance with Other Requirements<br>The project applicant shall comply with all other applicable federal, state, .... | Standard | General Conditions | Administrative |
| Compliance with Conditions of Approval<br>1. The project applicant and property owner, including successors, .... | Standard | General Conditions | Administrative |
| Blight/Nuisances<br>The project site shall be kept in a blight/nuisance-free condition. Any existing .... | Standard | General Conditions | Administrative |
| Severability<br>The Approval would not have been granted but for the applicability and validity .... | Standard | General Conditions | Administrative |
| Indemnification<br>1. To the maximum extent permitted by law, the project applicant shall defend .... | Standard | General Conditions | Administrative |

APPLY    CANCEL

FIG. 6

SYSTEMS AND METHODS FOR SMART ELECTRONIC FORM MANAGEMENT WITH CONDITION TRACKING

TECHNICAL FIELD

The field of disclosure relates generally to electronic form management and, more particularly, to smart electronic form management systems and methods with condition tracking.

BACKGROUND

Government agencies often manage and control aspects of residential and commercial development projects using various types of forms such as planning applications, building permits, inspection certifications, and the like. These projects may be subject to various conditions during a permitting process, typically mandated by federal, state, or local laws, regulations, ordinances, or the like. These "conditions of approval" may be established during a planning phase for a particular project (e.g., after a plan review, staff report, public hearing, and the like), and subsequently may be tracked and managed by various stakeholders in the project, such as the applicant, developers and/or contractors responsible with performing work under the project, inspectors responsible for certifying the completed work, and/or the local agencies governing the permitting process. Conditions of approval are typically identified and documented in a planning application for a particular project during its planning phase, and represent the conditions for which this project is subject during a permitting phase.

These conditions of approval, however, present several challenges and difficulties for the stakeholders. For example, there may be numerous conditions of approval assigned to the planning application for a project, each of which may define particular conditions applicable to the project, each of which may have their own compliance period and stakeholders impacted by the conditions. These conditions of approval can be difficult to track during the lifetime of the project, from the time they are assigned to the planning application to the various times that they are subject to activity during, and even after, the permitting phase. Historically, these conditions of approval are documented and published in the finalized planning application, a conventional paper document that, amongst other things, spells out the entitlement granted and all of the conditions of approval that are applicable during the permitting phase for that project.

What is needed is an electronic form management system that can provide technical solutions to help stakeholders review and track completion status of conditions of approval during the permitting process, and generate the reports needed to document the conditions and the planning application.

SUMMARY

In one aspect, an electronic form management system is provided. The electronic form management system includes at least one processor executing instructions that are configured to cause the at least one processor to: (i) provide first content configured to cause to be displayed a user interface (UI), the user interface being configured to enable a user to assign a plurality of conditions of approval data elements to a planning application, each condition of approval data element of the plurality of conditions of approval data elements including a completion status and one or more conditions to which a permit application is subject during a permitting phase; (ii) update a completion status of at least one condition of approval data element of the plurality of conditions of approval data elements in response to a condition being satisfied; (iii) calculate an aggregate completion status of a set of conditions of approval data elements; and (iv) provide second content configured to cause to be displayed at least one graphical interface element representing the calculated aggregate completion status of the set of conditions of approval data elements.

In another aspect, a computer-implemented method is provided. The method includes: (i) providing first content configured to cause to be displayed a user interface (UI), the user interface being configured to enable a user to assign a plurality of conditions of approval data elements to a planning application, each condition of approval data element of the plurality of conditions of approval data elements including a completion status and one or more conditions to which a permit application is subject during a permitting phase; (ii) updating a completion status of at least one condition of approval data element of the plurality of conditions of approval data elements in response to a condition being satisfied; (iii) calculating an aggregate completion status of a set of conditions of approval data elements; and (iv) providing second content configured to cause to be displayed at least one graphical interface element representing the calculated aggregate completion status of the set of conditions of approval data elements.

In yet another aspect, a non-transitory, computer-readable medium storing instructions is provided. When executed by at least one processor, the instructions are configured to cause the at least one processor to: (i) provide first content configured to cause to be displayed a user interface (UI) configured to enable users to assign a plurality of conditions of approval to a planning application, each condition of approval of the plurality of conditions of approval including a completion status and one or more conditions of approval; (ii) update a completion status of at least one condition of approval of the plurality of conditions of approval in response to a condition being satisfied; (iii) calculate an aggregate completion status of a set of conditions of approval; and (iv) provide second content configured to cause to be displayed at least one graphical interface element representing the calculated aggregate completion status of the set of conditions of approval data elements.

In still another aspect, an electronic form management system is provided. The electronic form management system includes at least one processor executing instructions that are configured to cause the at least one processor to: (i) provide first content configured to cause to be displayed a user interface (UI), the user interface being configured to enable a user to assign a plurality of conditions of approval data elements to a planning application, each condition of approval data element of the plurality of conditions of approval data elements including one or more conditions of approval to which a permit application is subject during a permitting phase; (ii) create an order list for the plurality of conditions of approval data elements causing each conditions of approval data element to be assigned a unique condition identifier (ID); (iii) provide second content configured to cause to be displayed a conditions of approval view showing the plurality of conditions of approval data elements in a list sorted based at least in part on the order list, the conditions of approval view allowing individual conditions of approval data elements to be selected and moved within the list based on user input; (iv) receive first input identifying a first condition of approval data element and a destination position within the order list; (v) update the order list by reassigning the first condition of approval data element to the destination position in the order list; and (vi) generate an electronic document that includes the plurality of conditions of approval appearing within the electronic document in order based on the updated order list, each condition of approval data element.

In still another aspect, a computer-implemented method is provided. The method includes: (i) providing first content configured to cause to be displayed a user interface (UI), the user interface being configured to enable a user to assign a plurality of conditions of approval data elements to a planning application, each condition of approval data element of the plurality of conditions of approval data elements including one or more conditions of approval to which a permit application is subject during a permitting phase; (ii) creating an order list for the plurality of conditions of approval data elements causing each conditions of approval data element to be assigned a unique condition identifier (ID); (iii) providing second content configured to cause to be displayed a conditions of approval view showing the plurality of conditions of approval data elements in a list sorted based at least in part on the order list, the conditions of approval view allowing individual conditions of approval data elements to be selected and moved within the list based on user input; (iv) receiving first input identifying a first condition of approval data element and a destination position within the order list; (v) updating the order list by reassigning the first condition of approval data element to the destination position in the order list; and (vi) generating an electronic document that includes the plurality of conditions of approval appearing within the electronic document in order based on the updated order list, each condition of approval.

In still another aspect, a non-transitory, computer-readable medium storing instructions is provided. When executed by at least one processor, the instructions are configured to cause the at least one processor to: (i) provide first content configured to cause to be displayed a user interface (UI), the user interface being configured to enable a user to assign a plurality of conditions of approval data elements to a planning application, each condition of approval data element of the plurality of conditions of approval data elements including one or more conditions of approval to which a permit application is subject during a permitting phase; (ii) create an order list for the plurality of conditions of approval data elements causing each conditions of approval data element to be assigned a unique condition identifier (ID); (iii) provide second content configured to cause to be displayed a conditions of approval view showing the plurality of conditions of approval data elements in a list sorted based at least in part on the order list, the conditions of approval view allowing individual conditions of approval data elements to be selected and moved within the list based on user input; (iv) receive first input identifying a first condition of approval data element and a destination position within the order list; (v) update the order list by reassigning the first condition of approval data element to the destination position in the order list; and (vi) generate an electronic document that includes the plurality of conditions of approval appearing within the electronic document in order based on the updated order list, each condition of approval data element.

BRIEF DESCRIPTION OF THE DRAWINGS

FIGS. 3A to 3D illustrate a sequence of screens provided by the admin interface of the form management service as viewed by the administrative user on the administrative computing device while creating or assigning conditions of approval to the planning application shown in FIG. 2.

FIGS. 4A and 4B illustrate a sequence of screens provided by the user interface of the form management service while the users view and manage the permit application and associated conditions of approval shown in FIG. 2.

FIG. 5B is a transaction selection screen that is displayed on the user interface after the user selects a link button on the related transactions screen shown in FIG. 5A.

FIG. 5D is a conditions selection screen that is displayed on the user interface after the user selects the "apply conditions of approval" menu item from the drop-down actions menu shown in FIG. 5C.

FIG. 6 is a condition reordering screen provided by the interfaces of the form management service that allows users to administer ordering of the conditions of approval shown in FIG. 2.

DETAILED DESCRIPTION

Figure 1:
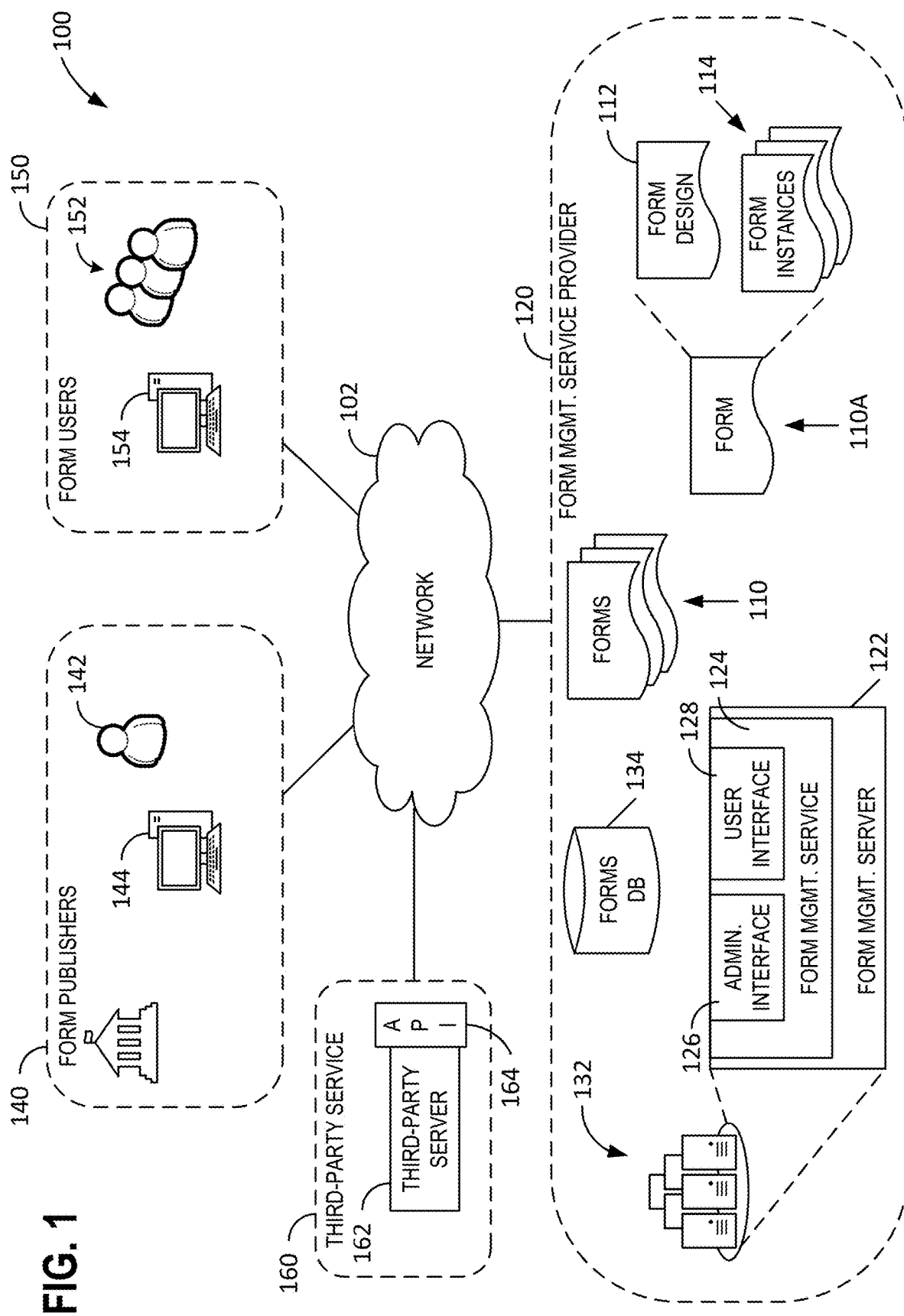
FIG. 1 is a network diagram of an example smart form management system that provides various form management services to form publishers and form users in accordance with the present disclosure.

In the following description, for the purposes of explanation, numerous specific details are set forth in order to provide a thorough understanding of the disclosure. One or more embodiments may be practiced without these specific details. Features described in one embodiment may be combined with features described in a different embodiment. In some examples, well-known structures and devices are described with reference to a block diagram form in order to avoid unnecessarily obscuring the present disclosure.

1. General Overview

Some form management applications may allow "form publishers," such as governmental agencies, to create and deploy various types of forms in an online environment (e.g., via the Internet or other network). These form designs may be configured by administrative users based on the content desired to be shown or collected as instances of the forms are created and used in day-to-day operation. Once a form is designed and deployed, such form instances may be created and populated by "form users," such as residents, builders, architects, inspectors, and the like (e.g., in the example use case involving government agencies working with residential and commercial property developers to facilitate administration of planning and permit applications). During the planning and permitting lifecycle of, for example, commercial or residential development projects, governing agencies (e.g., a local municipality where the project is targeted) may allow applicants to plan for and conduct such projects. During a planning phase, the applicant may submit a planning application to the local agency, during which time the agency may attach certain "conditions of approval" for the project before granting a permit entitling the applicant to continue into a permitting phase and perform the desired work under these conditions. However, technical limitations of conventional form management applications leave the management and tracking of such conditions of approval to be manually performed. For example purposes, the examples provided herein are presented in the context of residential and commercial property development and permitting with local government agencies (e.g., via use permits, development plans, and the like), but many other use cases are possible.

A smart form management system is provided herein that provides technical improvements to various aspects of known form management. In an example embodiment, the smart form management system described herein is provided as a software-as-a-service (SaaS) offering (e.g., as a cloud service via the Internet). A form service provider operates a form server and associated online applications that may be used by form publishers, form users, and possibly third-party service providers to create and manage smart forms in an online environment. In various examples provided herein, the form publishers are governmental agencies such as state or local governments, and the forms may be associated with various types of building permits or plans, inspection certifications, zoning approval forms, or the like. Form users are those people or entities, such as residents, business entities, commercial and/or residential builders, inspectors, and/or similar stakeholders, that complete aspects of the forms (e.g., entering information into the forms, completing requirements identified on the form, and such, as part of a building or construction project, home remodeling project, or the like).

The smart form management system provides a design interface (UI), or "planning UI," that allows form publishers to create, design, and publish smart forms for their various constituents. For example, a local municipality may design a planning application for a commercial development permit that businesses submit, for example, when they are planning an improvement to an existing commercial building, or planning to construct a new commercial building or demolish an existing building in the municipality's jurisdiction. During a planning phase, the design interface allows the form publisher, or "planning user," to attach conditions of approval to the planning application. Conditions of approval are conditions to which the project and associated permit are subject during the permitting phase. Such conditions of approval may include, for example, the number of parking spaces allowed at the new site, size limitations on the new building, landscape restrictions for exterior areas, inspection requirements for electrical, plumbing, fire, and the like.

Numerous such conditions of approval may be applied to any particular project, including standard conditions that municipalities may have for particular types of permits and conditions custom conditions that may be tailored specific to this particular project (e.g., based on public input, specific project plans, or such). In example embodiments, the planning UI provides a conditions of approval view that allows the planning user to view a pre-existing library of conditions of approval and assign any relevant conditions of approval to this particular planning application. Further, the planning UI also allows the planning user to create and attach new conditions of approval to the planning application or edit existing conditions of approval already attached to the planning application. Conditions of approval may be represented in the system as data elements that include, for example, one or more text or rich text fields describing condition(s) of approval, completion status field storing the current status of a particular condition of approval, type of compliance period describing by when the condition of approval is to be satisfied, as well as other data.

Once the planning application has been created, conditions of approval have been attached, and the planning application has been reviewed and approved by the municipality, the smart form management system creates a permit application for the project. More specifically, the system creates the permit application for this planning application and assigns each of the conditions of approval identified in the planning application with this permit application. Each condition of approval in the permit application is represented (e.g., in system memory) as an approval condition (or a "condition of approval") data element that includes a condition definition and a completion status, and may also include a compliance period and other associated fields. The condition definition defines (e.g., in writing, or as programmatic logic) one or more conditions associated with this condition of approval, such as a text field, a condition document, or the like. The completion status is a data component that represents what completion state this condition of approval is currently in (e.g., incomplete, partially complete, complete). The compliance period is a data component that defines when this condition of approval is applicable or otherwise needs to be completed during the project (e.g., prior to permit issuance, during construction of project, before inspection, before certificate of occupancy is issued, always applicable).

Once the permit application has been created, the smart form management system publishes the permit application online via a permitting UI. The permitting UI is used by the applicant, permit technicians, and other stakeholders (collectively, "permitting users") during the permitting phase of this project. The permitting UI allows those permitting users to interact with the permit application to, for example, allow the applicant to enter data into the permit application, allow permit technicians to review status of the permit application and approve the permit, and perhaps allow contractors or inspectors to view aspects of the permit and update conditions of approval assigned to themselves. As conditions of approval are completed or otherwise satisfied, the vested parties may use the permitting UI to update each particular condition of approval with a "completed" completion status.

The permitting UI also provides a status dashboard showing the current state of completion of the conditions of approval associated with the permit application. In example embodiments, the permitting UI displays multiple progress meters for the conditions of approval, where each progress meter provides a visual representation of completion for a particular group of conditions. For example, the permitting UI may group the conditions of approval based on the compliance period. For each compliance period type, the system may determine an aggregate completion percentage across all conditions of that type of compliance period (e.g., all conditions to be completed prior to permit issuance) and may display a progress meter, such as a dial, showing the percentage of completed conditions for that group in green and the remaining percentage in red. Similarly, the system may determine aggregate completion percentages for each of the other groups, by compliance period type, and may display progress meters for each such grouping. As such, this status dashboard provides a visual indicator to the permitting users as to how much of each particular group of conditions is completed for the project. Further, the progress meters may be user interactable (e.g., user selectable, mouse-over, soft touch, or the like), allowing the user to see a list of the approval conditions for that grouping, view the status of each individual condition, select or update individual conditions, or other similar functionalities. For example, on mouse-over of a particular progress meter, the form management service may display an abbreviated list of the conditions associated with that progress meter (e.g., brief description, current completion status, assigned party, notes) in a pop-up window.

Further, in some embodiments, the smart form management system may also allow some users to generate a report that includes the conditions of approval and, more particularly, to identify an order in which the conditions of approval are provided within the report. The system may, for example, provide a view in the UIs that allows a user to select and reorder (e.g., drag and drop within a list) the conditions or groups of conditions relative to the other conditions within the list. This custom ordering of the conditions of approval is tracked by the system using a custom index that is updated and maintained as the user reorders the list. When the user performs report generation, this custom index is used to determine the order in which the conditions of approval are inserted into the report (e.g., electronic document, printable document, or the like).

One or more embodiments described in this Specification and/or recited in the claims may not be included in this General Overview section.

2. System Architecture

FIG. 1 is a network diagram of an example smart form management system 100 that provides various form design and management services to form publishers 140 and form users 150 in accordance with the present disclosure. In the example embodiment, a form management service provider 120 executes a smart form management application (or "form management service") 124 on a form management server 122. Form management service 124 provides online access to various forms 110 via a computer network 102 such as the Internet. FIG. 1 illustrates two types of users of the service 124, including form publishers 140 and form users 150. Form publishers 140 may represent businesses or organizations, such as government agencies, that manage certain types of interactions with their constituents (e.g., private residents, commercial business entities, or the like, as one type of form user 150) using various types of forms 110. While many of the examples provided herein are described in the context of a government agency (e.g., as the form publisher 140) publishing planning and permit applications (e.g., as the forms 110) to their constituents (e.g., as the form users 150), it should be understood that many other use cases are possible for the smart form management system 100 described herein. It should be further understood that the term "form management" is used broadly to refer to aspects of form design, publication, creation, editing, review, processing, completion, reporting, accounting, and various other support and implementation aspects of forms, including the various examples described herein.

In the example embodiment, the form management server 122 is a virtual server provisioned from a cloud architecture 132 and includes various computing components (e.g., central processing units (CPUs), memory, networking hardware, and the like) sufficient to perform execution of the form management service 124 and associated functionalities as described herein. Further, the example form management service 124 is provided (e.g., to form publishers 140 and their associated users 150) as a SaaS application service offering executed in the cloud architecture 132, and may, for example, dedicate a physical machine or provision a virtual machine in the cloud architecture 132 as the form management server 122 for execution of the form management service 124. In some embodiments, the form management system 100 may provide the herein described functionalities and content to the computing devices 144, 154 in a browser-based architecture (e.g., transmitting content that is rendered by a local browser), in an application-based architecture (e.g., client/server architecture with a client application installed locally on the user computing devices), or the like. It should be understood that other hardware architectures, form publishers, and form users are possible.

Forms 110 represent an online, virtual, and smart embodiment of what may have historically been published and circulated as physical paper forms or printable form images. In the example embodiment, each particular form 110A includes a form design 112 and may include one or more instances of that form (or "form instances 114"). A form design 112 is created by the form publisher 140 and defines various pages, data fields, descriptive or instructional text, user-defined instructions, and other such content and functionality used to complete a form 110. The form design 112, in other words, is a data structure definition of all of the contents of the form, including various data components that define, for example, what inputs the permit application will accept from the applicant, what data will be shown to the applicant, and how various other form functionalities described herein will be performed when this application is presented (e.g., when displayed on a remote computing device, such as devices 144, 154). These various parts of the form design are referred to herein as data components of the form 110. When a particular form user 152 creates an instance 114 of a particular form 110, the form design 112 is used as a template to create that form instance 114. In other words, the form design 112 defines the data structures of the form 110, where each instance 114 of that form 110 allocates persistent memory for that instance based on the form design 112. The term "form" may be used interchangeably herein to refer to a particular form design 112, to a particular form instance 114, or to both, depending on context.

In the example embodiment, the form management service 124 provides a graphical administrative interface (or just "admin interface") 126 through which form publishers 140 administer their own library of forms 110 (e.g., via an administrative computer 144). The admin interface 126 may be referred to herein as a planning UI 126. The admin interface 126 allows a form administrator 142 to create form designs 112 (e.g., define the structure and contents of forms 110), publish those forms 110 for use by form users 150, and manage instances 114 of those forms 110 created by form users 150. For example, a county government may require property owners to submit a mechanical, electrical, or plumbing permit application whenever the property owner anticipates performing certain types of work or improvements to a property within the agency's jurisdiction. As such, the form administrator 142 may use admin interface 126 to create a form design 112 for the permit application. The admin interface 126 allows the form administrator 142 to create a new form family for the permit application, create a first version of the permit application, configure various settings for that permit application, add pages to the permit application, and add data fields and text to the permit application, and the like.

After the form administrator 142 completes the form design 112 for this example form 110 (e.g., the permit application), the form administrator 142 may publish the form 110 for use. Publication of the form 110 allows form users 150 to create their own instances 114 of the form 110 within the system 100. In the example embodiment, the form management service 124 provides a user interface 128 through which form users 152 create, manage, or otherwise interact with instances 114 of the forms 110 (e.g., via user computing devices 154). More specifically, the user interface 128 allows form users 152 to create form instances 114 of particular forms 110 (e.g., for designs 112) published by the form publisher 140 and interact with those form instances 114 (e.g., filling out data fields and the like). For example, a property owner may plan to have an air conditioner or heater (HVAC) replaced in their residential home, and their local jurisdiction may mandate submission and approval of a mechanical permit application prior to start of that work, and may also mandate inspection of the work after completion. As such, the property owner (the "applicant," as one example form user 152) may use the user interface 128 to initiate creation of a form instance 114 of the mechanical permit application (e.g., as form 110A) published by their county government (e.g., as form publisher 140). Upon submission of this creation request, the form management service 124 creates the form instance 114 on behalf of the submitting user 152, using the form design 112 associated with that form 110A as the template for this new form instance 114. Further, in addition to the applicant, the form management system 100 may also allow other parties to be users 152 of the form instance 114. For example, some forms 110 may be configured to include participation (e.g., additional inputs, certifications, signatures, or the like) from contractors or sub-contractors performing the underlying work, inspectors (e.g., certifying the work after completion), utilities (e.g., certifying utility tasks), banks (e.g., certifying financing), emergency services (e.g., certifying safety inspections), or other government agencies. Such parties may interact with the form instances 114 via the user interface 128.

In the example embodiment, form designs 112 and various form instances 114 of forms 110 are stored in a forms database 134 that is accessible by the form management service 124. Each form design 112 may be assigned to a particular form publisher 140, and each form instance 114 may be assigned to a particular form user 152, such as the form user 152 that created that form instance 114 (the permit applicant, in this example).

In some embodiments described herein, the form management service 124 may be configured to support various management and tracking functionalities associated with conditions of approval. Conditions of approval are conditions to which a particular project and associated form(s) are subject. In example embodiments, a planning user (e.g., as form administrator 142), such as a city planner, may create an instance of a planning application for the project (e.g., as a form instance 114 of a design 112 for planning applications), such as a new building construction project. During a planning phase of that project, the planning administrator assigns various conditions of approval to the planning application. Once the planning application has been approved, the form management service 124 creates an instance of a permit application associated with this planning application and this project (e.g., as a form instance 114 of another design 112 for permit applications). All of the conditions of approval contained in the planning application are also assigned to the associated permit application. Each of these conditions of approval include data elements storing condition definitions, completion status, and a compliance period. These conditions of approval are managed in the permit application, via the user interface 128, by various stakeholders through the lifecycle of the project.

For example, the user interface 128 may be configured to allow stakeholders to update status information associated with each of the conditions of approval that are assigned to this permit application. In some example embodiments, the user interface 128 allows users 152 to interact with the permit application to, for example, allow the applicant to enter data into the permit application, allow permit technicians to review status of the permit application and approve the permit, and/or perhaps allow contractors or inspectors to view aspects of the permit and update conditions of approval assigned to themselves. As conditions of approval are completed or otherwise satisfied, the users 152 may use the user interface 128 to update each particular condition of approval with a "completed" completion status.

The user interface 128 may also provide a status dashboard showing the current state of completion of the conditions of approval associated with the permit application. In some embodiments, the user interface 128 displays multiple progress meters for the conditions of approval, where each progress meter provides a visual representation of completion for a particular group of conditions. For example, the user interface 128 may group the conditions of approval based on the compliance period. For each compliance period type, the form management service 124 may determine an aggregate completion percentage across all conditions of that type of compliance period (e.g., all conditions to be completed prior to permit issuance) and may display a progress meter, such as a dial, showing the percentage of completed conditions for that group in green and the remaining percentage in red. Similarly, the form management service 124 may determine aggregate completion percentages for each of the other groups, by compliance period type, and may display progress meters for each such grouping. As such, this status dashboard provides a visual indicator to the users 152 as to how much of each particular group of conditions is complete for the project. Further, the progress meters may be user interactable (e.g., user selectable, mouse-over, soft touch, or the like), allowing the users 152 to see a list of the approval conditions for that grouping, view the status of each individual condition, select or update individual conditions, or other similar functionalities.

In some embodiments, the form management service 124 may also allow some users 142, 152 to generate a report that includes the conditions of approval and, more particularly, to identify an order in which the conditions of approval are provided within the report. The form management service 124 may, for example, provide a view in the UIs 126, 128 that allows users 142, 152 to select and reorder (e.g., within a list) the conditions or groups of conditions relative to the other conditions within the list. This custom ordering of the conditions of approval is tracked by the form management service 124 using a custom index that is updated and maintained as the user reorders the list. When the user performs report generation, this custom index is used to determine the order in which the conditions of approval are inserted into the report (e.g., electronic document, printable document, or the like).

Various aspects of functionality associated with managing and tracking conditions of approval associated with forms 110 are described and illustrated in greater detail below.

3. Application Process Overview

Figure 2:
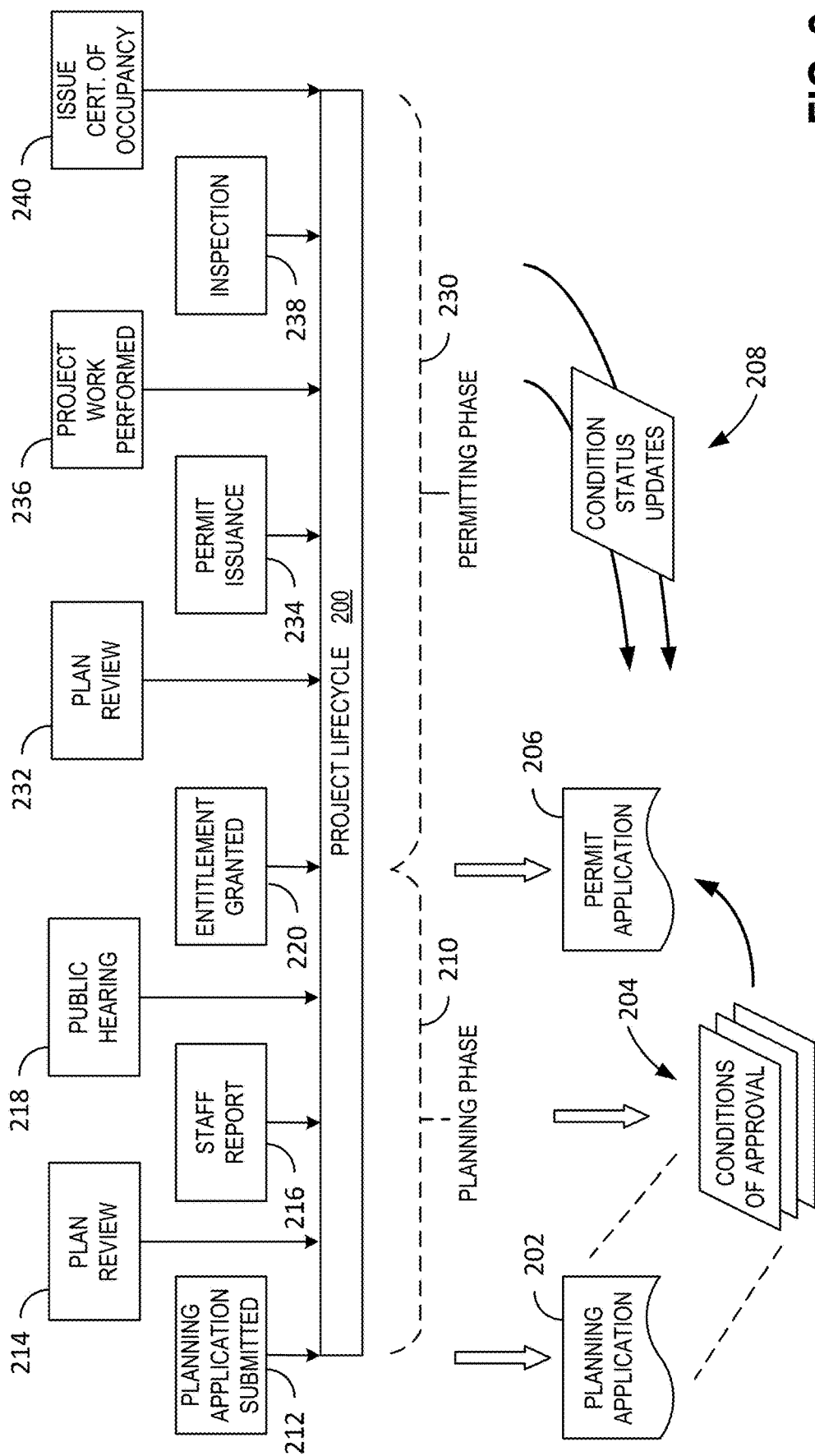
FIG. 2 is a data structure diagram that illustrates a project lifecycle for an example development project, as well as various data components used by the smart form management system shown in FIG. 1 to manage conditions of approval associated with the project.

FIG. 2 is a data structure diagram that illustrates a project lifecycle 200 for an example development project, as well as various data components used by the smart form management system 100 (shown in FIG. 1) to manage conditions of approval 204 associated with the project. In this example, an applicant, such as a commercial business entity, is pursuing permission to construct a new commercial building within the jurisdiction of a governing agency, such as a municipality. The municipality, as the form publisher 140, uses the smart form management service 124 shown in FIG. 1 to provide planning and permitting application management services to their constituents, such as the commercial business entity. FIG. 2 illustrates an example timeline shown in data structure diagram of the application process and project lifecycle 200 for this example project.

In the example embodiment, the planning and permitting process shown in FIG. 2 includes a planning phase 210 and a permitting phase 230. In the planning phase, the applicant (e.g., the business entity) submits a planning application 202 at operation 212. This planning application 202 is, for example, a form instance 114 of a form 110 previously created and published by the form publisher 140 for this type of development project, as shown in FIG. 1. The planning phase 210 is administered by the form publisher 140, typically a city planner or "planning user" of the municipality or other governing agency (e.g., as a user 142). The planning application 202 is configured with details about the proposed project that are reviewed by the municipality during the planning phase 210 at operation 214. At operation 216, a staff report is created by, for example, a city planner. During operation 216, the city planner uses the admin interface 126 to assign conditions of approval 204 to this particular planning application 202. Each condition of approval 204 is represented (e.g., in system memory) as an approval condition data element that includes a condition definition and a compliance period, and may also include a completion status and other associated fields. The condition definition defines (e.g., in writing as a text field or other text-viewable format, or as programmatic logic) one or more conditions associated with this condition of approval. The completion status is a data component that represents what completion state this condition of approval is currently in (e.g., incomplete, partially complete, complete), and may be added to conditions of approval 204 in the permitting phase 230. The compliance period is a data component that defines when this condition of approval is applicable or otherwise needs to be completed during the project (e.g., prior to permit issuance, during construction of project, before inspection, before certificate of occupancy is issued, always applicable). It should be understood that a particular condition of approval 204 may define a single condition or may define multiple conditions that are effectively bundled together and collectively represented as a single condition of approval 204 in the system 100.

For example, the admin interface 226 may provide a screen that displays a library of pre-configured conditions of approval (e.g., stored in the forms database 134) that are commonly used by the municipality for their applications. From this library, the city planner may select which pre-configured conditions of approval to assign to this particular planning application 202 and what compliance period to assign to each condition of approval 204. The admin interface 126 may also provide a screen that allows the city planner to create and assign new conditions of approval to this planning application 202 or edit conditions of approval 204 already assigned to this application (e.g., drafting or editing text language describing the conditions definition, identifying a compliance period for the condition). Configuration and administration of the conditions of approval 204 in the planning application 202 is described in greater detail below in FIGS. 3A to 3D.

In some embodiments, the planning phase 210 may include a public hearing at operation 218, which may lead to changes to the conditions of approval 204 attached to the planning application 202. When the municipality decides that the planning application 202 is sufficient to allow this project to continue forward, the city planner approves the planning application 202 (e.g., in the admin interface 226), granting entitlement to the applicant, and thereby causing the form management service 124 to automatically create a permit application 206 or otherwise permission the applicant to create the permit application 206 for this project at operation 220.

In some embodiments, conditions of approval 204 may be resolved in the planning phase 210 (e.g., as a pre-condition prior to migration to the permitting phase 230). For example, some government agencies may impose pre-release conditions, such as specific requirements that must be met before zoning entitlement can be granted to the applicant (e.g., documentation of an approved Erosion Control Plan from a city's stormwater planning engineer, copies of proposed replacement window specifications, or a revised landscaping or parking plan). As such, the admin interface 226 may provide a group conditions screen 440, such as shown and described below in FIG. 4B, that allows for manual completion of conditions of approval 204, or the form management service 124 may otherwise allow for automatic completion of such conditions (e.g., for conditions with a compliance period of "prior to permit issuance").

The permitting phase 230 begins, in this example, after operation 220, with the entitlement and creation of the permit application 206. In the example embodiment, the permit application 206 automatically inherits all of the conditions of approval 204 that were assigned to the associated planning application 202. Where the planning phase 210 was used to prepare for the work performed during the project, including establishing the conditions of approval under which the project will be performed, the permitting phase 230 is used to issue the permit for the work to be performed and to monitor that work and compliance with the conditions of approval that were decided during the planning phase 210. As such, the conditions of approval 204 flow from the planning application 202 to the permit application 206. In some embodiments, the form design 112 of the permit application 206 may include separate, dedicated data components for the conditions of approval 204 and the conditions of approval 204 may be copied from the permit application. In other embodiments, the conditions of approval 204 of the permit application 206 may be linked from the data components of the planning application 202. In some scenarios, some conditions of approval 204 may be configured, in the planning phase 210, with file attachments, links, or additional notes (collectively referred to herein as "condition attachments"). For example, prior to issuing the permit application 206, the applicant may be asked to submit a numbered list with a written response on how each condition of approval 204 contained in the report will be satisfied, and such submission may be attached to one or more of the conditions of approval 204. Such condition attachments may similarly flow to the permit application 206. In some embodiments, condition attachments may be configured to flow, or not to flow, through to the permit application 206 (e.g., via a user-provided toggle). During the permitting phase, each condition of approval 204 includes a completion status data component, which may be added to the conditions of approval 204 of the permit application 206.

In the example embodiment, the permitting phase 230 is administered by the form publisher 140, typically a permit technician (e.g., as a user 142). The permit application 206 is also a form instance 114 of a form 110 previously created and published by the form publisher 140 for this type of permit, as shown in FIG. 1. Upon creation, the permit application 206 may be initially populated with some applicant data from the associated planning application 202 (e.g., in addition to the conditions of approval 204). Further, the applicant may modify the permit application 206 (e.g., via the user interface 128), adding any additional data that may be needed for the permitting process. At operation 232, the permit technician reviews the plan and the permit application and determines when the permit application matures to the issuance of a permit at operation 234. Issuance of the permit at operation 234 typically signifies that the applicant has official permission to begin work on this project, though under the constraints of the conditions of approval 204. The permit application remains active even after issuance of the permit, as the progress of the permitted work is tracked through the permitting phase of this project.

In the example embodiment, operation 236 represents the period in which the permitted work is performed for this project, and operation 238 represents inspection of portions of the performed work that may be mandated for the project (e.g., some of which may be mandated by the conditions of approval 204). During the permitting phase 230, the permit application 206 may be updated as the project progresses. More specifically, in the example embodiment, the status of various conditions of approval may be updated via condition status updates 208 during the permitting phase 230. As mentioned above, each condition of approval 204 may have a defined compliance period, such as "prior to permit issuance," "during construction," "before inspection," "before certificate of occupancy/completion is issued," or "always applicable." With the exception of "always applicable," each of these types of compliance periods defines a timeframe by which that particular condition of approval is to be completed. It should be understood that these example compliance period types are provided as examples, but other compliance period types are possible. Further, the example compliance period types are referenced herein with quoted, descriptive titles, such as "prior to permit issuance" or "always applicable," but it should be understood that these compliance period types may be represented, in memory within the smart form management system 100, using type codes, type identifiers, or any such suitable representation.

As such, the user interface 128 provides a screen that allows stakeholders to update conditions of approval with completion status data (e.g., toggling completion status between "incomplete," "partially complete," and "complete," or similar completion status states). In some embodiments, any stakeholder permissioned to administer the permit application 206 may be permissioned to submit condition status updates 208 for any of the conditions of approval 204. In some embodiments, some or all conditions of approval 204 may be assigned to particular stakeholders or particular groups of stakeholders (e.g., based on job role, responsibility for completing the work, responsibility for overseeing completion of work items, responsibility for compliance with the particular condition of approval, or the like) and update permission may be restricted for such conditions of approval 204. In some embodiments, the user interface 128 may further provide a status detail field that allows the stakeholders to add additional details to the completion status for each condition of approval, such as a text field for describing additional details regarding status, file attachment for attaching related files such as audio, video, or other file types for documenting aspects of completion, or the like.

Accordingly, as the permitting phase 230 continues, each condition of approval 204 for the permit application 206 has a current status and can be viewed, tracked, and updated by the various stakeholders. In the example embodiment, the user interface 128 provides a dashboard that displays progress meters (not shown in FIG. 2) summarizing the current status of groupings of conditions of approval 204. These progress meters provide the users 152 high level visibility into the current overall state of the conditions of approval, and also provide user input actions that allow the users 152 to quickly see deeper details regarding the conditions of approval. In one example embodiment, the conditions of approval are grouped based on their compliance period, with each compliance period having a dedicated progress meter. Progress meters are described below in greater detail below in FIGS. 4A and 4B.

As the project progresses, conditions of approval 204 are updated by the various stakeholders as status changes. At various stages in the permitting process, the permit technician or other stakeholders may use the progress meters to review compliance. For example, the permit technician may review the progress of all "prior to permit issuance" type conditions of approval prior to issuing the permit at operation 234, and may delay the permit issuance until all of the "prior to permit issuance" type conditions of approval are complete.

As the overall project is approaches completion, the status of all of the conditions of approval should also approach completion (excepting those "always applicable" type conditions). The permit technician may verify that all of these dynamic conditions of approval are complete prior to completing this project, which in this example includes issuing a certificate of occupancy at operation 240.

4. Example Administrative Interface Screens

Figure 3A:
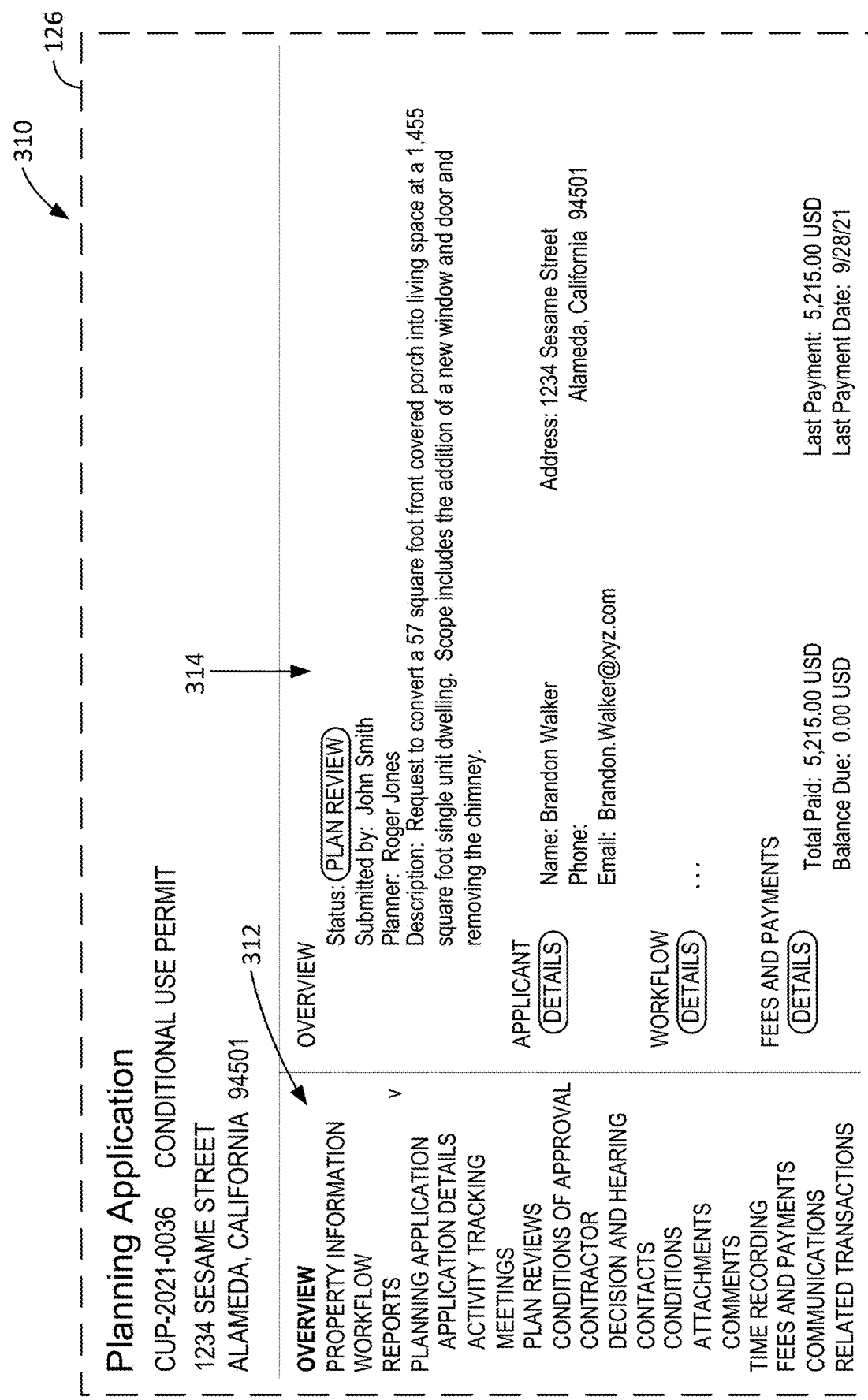

FIGS. 3A to 3D illustrate a sequence of screens provided by the admin interface 126 of the form management service 124 as viewed by the administrative user 142 on the administrative computing device 144 while creating or assigning conditions of approval 204 to the planning application 202 shown in FIG. 2. FIG. 3A is a planning application overview screen 310 showing an example planning application, such as planning application 202. In this example, the planning application 202 is for a conditional use project that involves an applicant request to convert a covered porch into an interior living space of a residential dwelling. The planning application overview screen 310 includes a navigation pane 312 on the left side of the screen 310 and a page details pane 314 in the middle of the screen 310, where the navigation pane 312 may be used to change the view of the page details pane 314. In this example, the user 142 (e.g., a city planner) is currently seeing overview information within the page details pane 314 because the "planning application" parent tab is currently selected within the navigation pane 312.

Figure 3B:
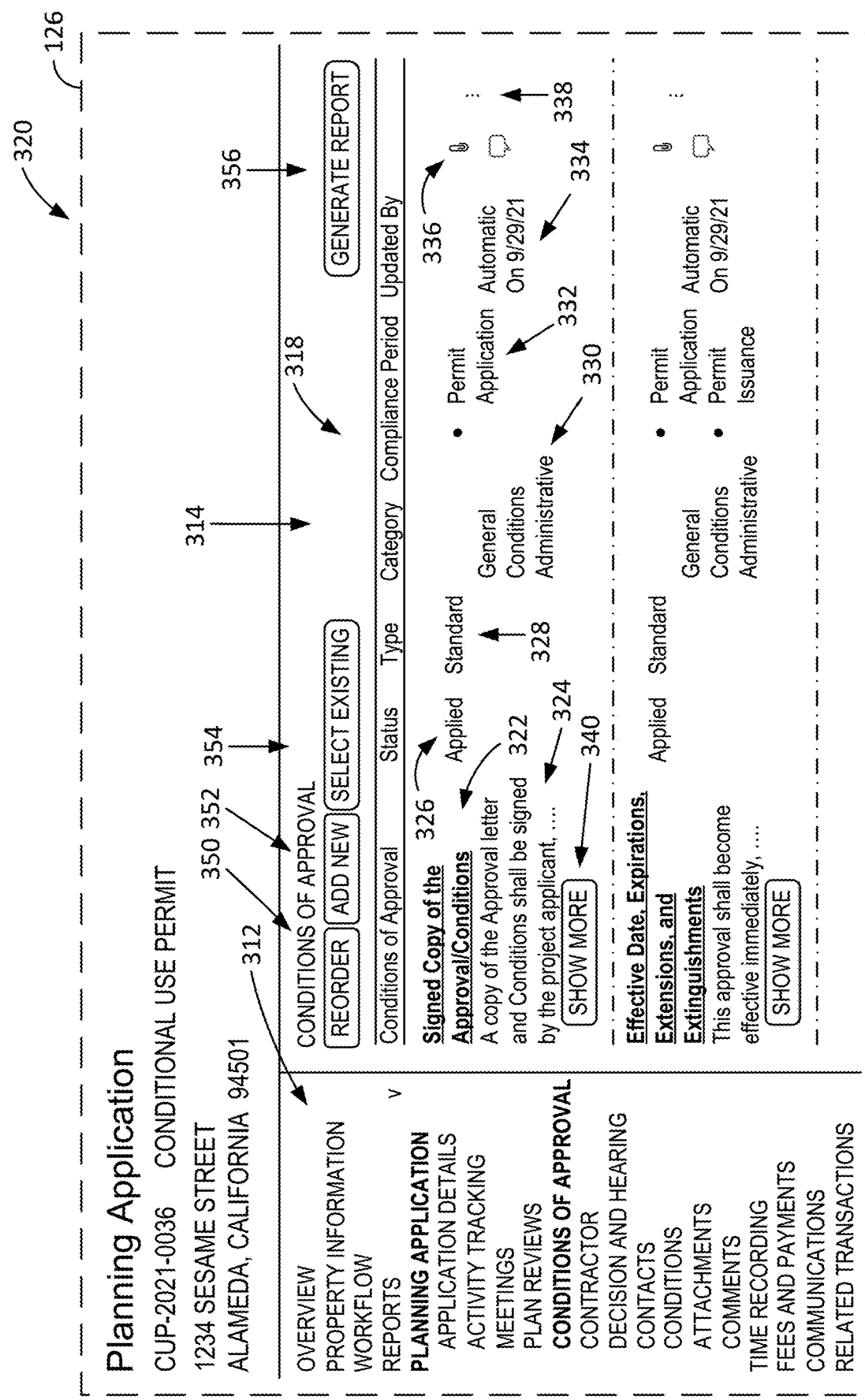

FIG. 3B is a conditions of approval screen 320 that is displayed on the admin interface 126 after the user 142 selects the "conditions of approval" tab in the navigation pane 312. In the example embodiment, the conditions of approval screen 320 displays, in the page details pane 314, a list 318 of conditions of approval 204 currently assigned to this planning application 202. Each individual entry in the list 318 represents an individual condition of approval 204 or a grouping of multiple conditions of approval 204. The list 318 displays various information for each condition of approval 204, including a title 322 and a summary description 324, a completion status 326, a type 328, categorization information 330, a compliance period 332, and status update information 334 (e.g., source of the most recent completion status 326), as well as several user interaction icons, including link and notes icons 336 (e.g., for attaching files to, or making notes for, this particular condition 204) and a drop-down menu icon 338. Further, each entry in the list 318 includes a "show more" link 340 that can be used to display further details about that entry (e.g., expanding the entry to display greater details about that condition of approval, such as the full description definition, providing an interface that allows the user 142 to edit that condition of approval).

In the example embodiment, the conditions of approval screen 320 also includes a "reorder" button 350, an "add new" button 352, a "select existing" button 354, and a "generate report" button 356. The reorder button 350 provides various ordering options that allows the user 142 to change the way the list 318 is ordered. FIG. 6 provides greater details regarding reordering of conditions of approval for report generation. The add new button 352 provides a screen that allows the user 142 to create a new condition of approval for this planning application 202. Creation of conditions of approval is described below in FIG. 3D. The select existing button 354 allows the user 142 to view a library of pre-configured conditions of approval (or groups of conditions of approval) and to select conditions of approval 204 from the library for assignment to this planning application 202. Assigning conditions of approval 204 from the library is described below in FIG. 3C. The generate report button 356 allows the user 142 to generate reports for this planning application 202 based on an ordering of the conditions of approval 204 described in greater detail below in FIG. 6.

FIG. 3C is a library selection screen 360 that is displayed on the admin interface 126 after the user 142 selects the "select existing" button 354 in the conditions of approval screen 320 shown in FIG. 3B. In the example embodiment, the library selection screen 360 displays a list 362 of conditions of approval that are stored in the library. The list 362 includes data components for each pre-configured condition of approval similar to the list 318 shown in FIG. 3B. The user 142 can select one or more pre-configured conditions of approval and add them to the planning application 202 or cancel out of this screen 360 to return to the conditions of approval screen 320. Selection and addition of any of the pre-configured conditions of approval from screen 360, in the example embodiment, causes copies of those pre-configured conditions of approval to be added as conditions of approval 204 to the planning application 202, where in other embodiments, the addition of pre-configured conditions may add a link to the selected conditions in the library (e.g., as a reference, in lieu of or in addition to a partial or full copy). Once added to the planning application 202, these pre-configured conditions may be edited from the conditions of approval screen 320 (e.g., allowing the user 142 to change any of the settings of the conditions, such as the condition definition, the compliance period, or any of the data components of the conditions of approval shown or described herein.

FIG. 3D is a condition editor screen 370 that is displayed on the admin interface 126 after the user 142 when adding or editing a particular condition of approval 204 from the list 318 in the conditions of approval screen 320 shown in FIG. 3B. In the example embodiment, the condition editor screen 370 includes a rich text editor window 372 and associated tool icons that allows the user 142 to add or edit the title 322, brief summary 324, and/or detailed description (e.g., condition definition) of a condition of approval 204. The condition editor screen 370 also includes an attributes pane 380 that allows the user 142 to view and edit various attributes of this condition of approval 204, such as condition status 326, condition type 328, condition category 330A and subcategory 330B, and compliance period 332.

In the example shown here, the editor window 372 is shown empty, after the user 142 presses the "add new" button 352 on the conditions of approval screen 320. As such, the user 142 is free to add new rich formatted text into the editor window 372 that describes the conditions and other descriptive or instructional text within this particular condition of approval 204, as well as any other descriptive or instructional text, as the user 142 sees fit. When editing an existing condition of approval 204, the editor window 372 is populated with the text already configured in the condition definition for this condition of approval 204 and the editor window 372 allows the user 142 to add to, modify, delete, or otherwise change and save the condition definition for this condition of approval 204. The condition definition is saved, by the form management service 124, as rich format text and may be displayed as rich format text in the various screens presented by the interfaces 126, 128 or in reports generated by the smart form management system 100.

5. Example Dashboard with Conditions of Approval

Figure 4A:
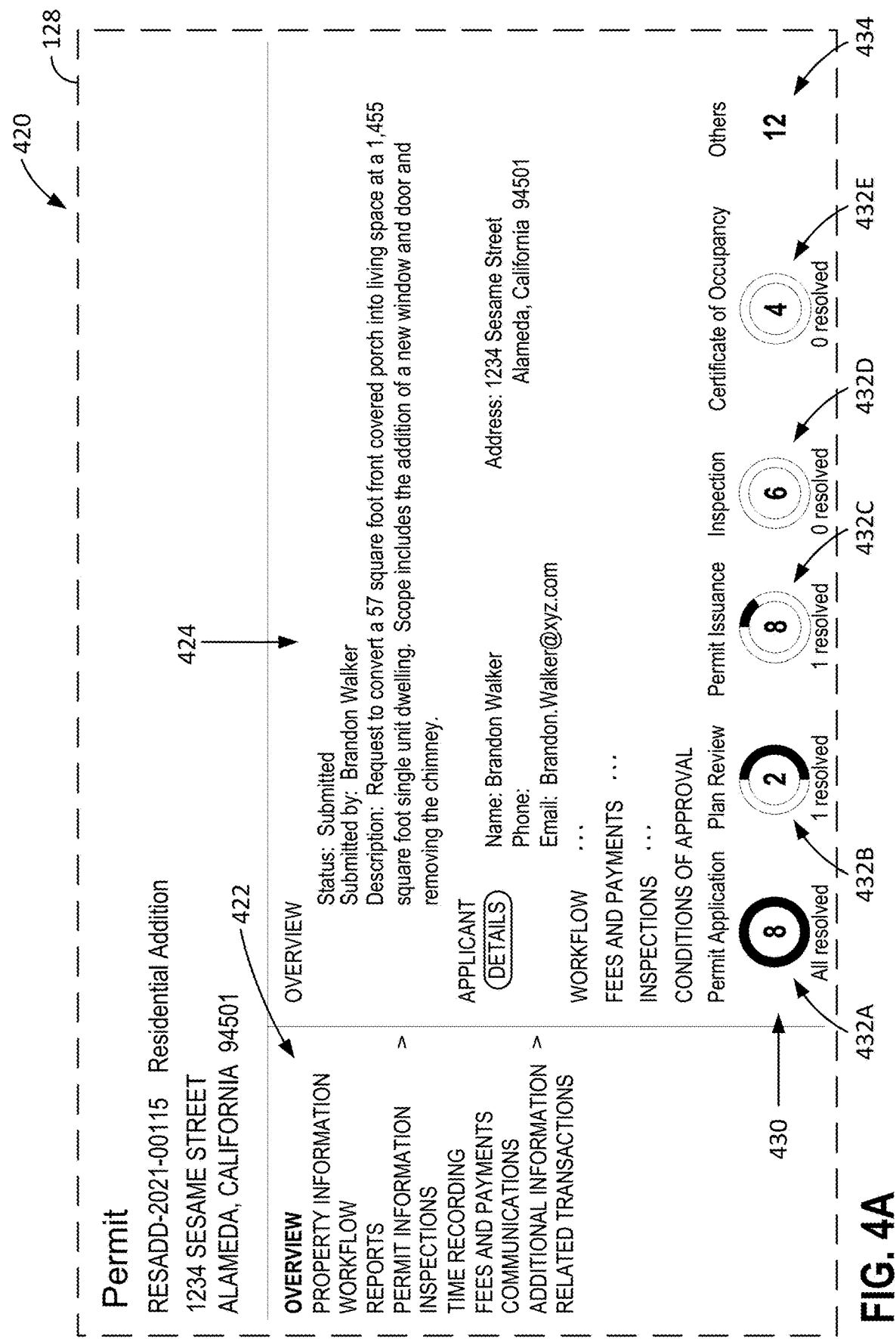
Figure 4B:
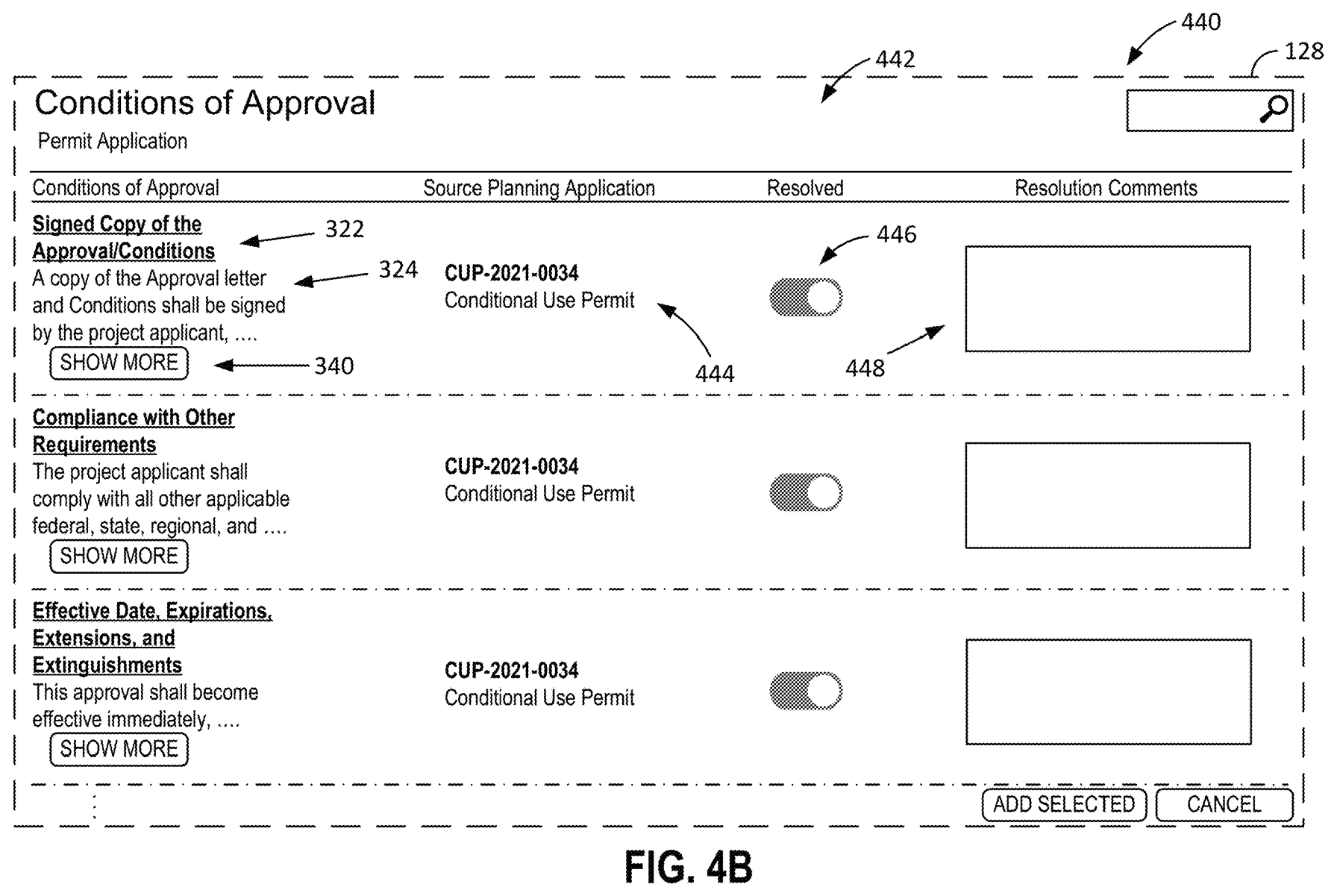

FIGS. 4A and 4B illustrate a sequence of screens provided by the user interface 128 of the form management service 124 while the users 142, 152 view and manage the permit application 206 and associated conditions of approval 204 shown in FIG. 2. FIG. 4A is a permit application overview screen 420 showing an example permit application 206 that was generated and associated with the example planning application 202 described in FIGS. 3A-3D. In the example embodiment, the permit application screen 420 includes a navigation pane 422 on the left side of the screen 420 and a page details pane 424 in the middle of the screen 420. In this example, the user 142, 152 (e.g., applicant, permit technician, or other stakeholder) is currently seeing overview information within the page details pane 424 because the "overview" tab is currently selected within the navigation pane 422. The overview tab displays various high level information about this permit application, such as applicant information, project description, workflow status, fee details, and inspection details.

In addition, in the example embodiment, the overview tab also displays a conditions of approval status dashboard (or just "dashboard" or "status dashboard") 430 that displays information about the current status of the conditions of approval 204 associated with this permit application 206. More specifically, the status dashboard 430 includes multiple graphical interface elements 432, each of which represents an aggregate status of a particular grouping of conditions of approval 204. These graphical interface elements 432 may also be referred to herein as progress meters 432, as the progress meters 432 provide a visual representation of how much progress has been made toward completion for that particular grouping of conditions of approval 204 (e.g., as a percentage complete or incomplete, as determined by the condition status of the conditions of approval 204 within that group).

In the example embodiment, the form management service 124 groups conditions of approval 204, at least partially, by compliance period type. For example, a permit application progress meter 432A represents all conditions of approval having a compliance period set to "prior to permit application" (e.g., all conditions of approval that are marked to be completed prior to the creation of this permit application 206 at operation 220 of the planning phase 210). Similarly, the dashboard 430 also includes a plan review progress meter 432B (e.g., all conditions of approval marked to be completed prior to the plan review operation 232 of the permitting phase 230), a permit issuance progress meter 432C (e.g., all conditions of approval marked to be completed prior to the permit issuance operation 234 of the permitting phase 230), an inspection progress meter 432D (e.g., all conditions of approval marked to be completed prior to inspection of some associated work at operation 238 of the permitting phase 230), and a certificate of occupancy progress meter 432E (e.g., all conditions of approval marked to be completed prior to the issuance of the certificate of occupancy for this project at operation 240 of the permitting phase 230).

In the example embodiment, the form management service 124 determines an aggregate status for each of these groupings of conditions of approval 204 that is used to show, on the progress meter, the overall status of that particular grouping. More specifically, for each particular grouping (e.g., for each particular compliance period type), the form management service 124 determines the total number of conditions of approval 204 of that compliance period type assigned to this permit application 206. Further, from this subset of conditions of approval 204 for this particular group, the form management service 124 also determines the number of those conditions of approval 204 that are marked as complete and the number that are marked as incomplete (e.g., based on the completion status of each individual condition of approval 204). As such, the form management service 124 determines a percentage complete for the group (e.g., dividing the number of complete conditions of approval 204 by the total number of conditions of approval 204 in this particular grouping), and similarly determines a percentage incomplete (e.g., dividing the number of incomplete conditions of approval 204 by the total number of conditions of approval 204 in this particular grouping).

In some embodiments, the form management service 124 may subdivide the aggregate completion status indicators based on assignment of the grouping of conditions of approval 204. For example, some conditions of approval 204 may be assigned to particular individuals or groups, and may thus identify a sub-grouping of conditions of approval 204 within this group based on this assignment. The form management service 124 may identify the identity of the user 142, 152 currently viewing the permit application 206, and perhaps an associated user group, and may determine a separate aggregate completion status for the particular user/group and all others. For example, an inspection firm may be identified as a particular user/group, and one of the inspectors within that user group may be currently viewing the permit application 206. As such, the form management service 124 may sub-divide each grouping of conditions of approval further into those conditions assigned to the user/group and the remainder of the conditions within that group. As such, the progress meter 432 may be configured to determine and show the percentage complete and incomplete for this user/group in a first and second color or shading (e.g., green and yellow) and the percentage of complete and incomplete for all other users/groups in a second and third color or shading (e.g., dark grey and light grey).

To visually convey this completion data for each of these progress meters 432, the form management service 124 displays a progress dial that represents the complete and incomplete percentages around a circumference of the dial. More specifically, in the example embodiment, the progress dial includes a completed portion that may be shaded or colored in one distinct method, as well as an incomplete portion that may be shaded or colored in another distinct method, where each of the completed portions and the incomplete portions are populated as a percentage of the circumference of the progress dial. In other embodiments, the progress meters 432 may be presented in the form of a progress bar or a progress bubble, where the percentage complete is shown as a shaded or colored equivalent volumetric portion of the progress meter. While the example embodiments provided here use two completion status types (e.g., complete and incomplete) for each condition of approval 204, it should be understood that more than two completion status types may be used, and the progress meters 432 may similarly distinguish between the additional completion status types.

In this example permit application 206, the application 206 has eight conditions of approval 204 having a compliance period type set to "prior to permit issuance," all of which are currently completed. As such, the plan review progress meter 432B represents two conditions of approval (e.g., as identified by the "2" at the center of the dial), one of which is complete, the other of which is incomplete. As such, the percentage complete for this progress meter is 50%, where the percentage incomplete for this progress meter is also 50%. Accordingly, the dial for this progress meter 432B shows 50% of the circumference of the dial as "full" (e.g., in this example, stippling is used to represent the completed portion), and the other 50% of the circumference of the dial as "empty." Similarly, the permit issuance progress meter 432C has eight total conditions of approval in this grouping (e.g., as identified by the "8" as the center of the dial), only one of which is complete (e.g., 12.5%). As such, the dial for the permit issuance progress meter 432C shows 12.5% of the dial as full and the remaining 87.5% as empty.

To further improve visual status representation, the progress meters 432 may also include additional visual features. In some embodiments, the progress meters 432 use color to indicate some aspects of status for the "full" portion of the dial. When a percentage completed is 100%, the full portion of the dial is represented in a first color, such as green, and when the percentage complete is less than 100%, the full portion of the dial is represented in a different, second color, such as yellow. In some embodiments, the color of the full portion may be dynamically determined from a range of colors (e.g., on a range of the color spectrum, from red to orange to yellow to green) based on percentage complete. For example, lower percentages may be represented by red (e.g., 0% to 25%), increasing to red-orange for slightly higher percentages (e.g., 26% to 50%), to orange for higher percentages (e.g., 51% to 75%), to yellow for still higher percentages (e.g., 76% to 99%), to green for 100%. In some embodiments, ranges may be used for such color determination, where in other embodiments, a more continuous color spectrum may be used by determining an RGB color based on the percentage complete. In some embodiments, this color may, additionally or alternatively, be used for the total number of conditions of approval appearing in the center of the dial, the title of the progress meter 432, or the text indicating the number of resolved conditions below the progress meter 432.

In the example embodiments, the progress meters 432 are also user interactable. More specifically, in one example embodiment, the form management service 124 may provide a user input action for each progress meter 432 that, when activated by user input of the users 142, 152, causes a group conditions screen (not shown in FIG. 4A) to appear. For example, each progress meter 432 may be displayed with a user-selectable input action (e.g., selection, mouse click, touch, soft touch, or the like) that activates the group conditions screen. The group conditions screen is described in greater detail in FIG. 4B.

In some embodiments, the dashboard 430 also includes an "other conditions" graphical interface elements (or just "other conditions meter") 434. This other conditions meter is used to represent all of the conditions of approval 204 for this permit application 206 that are not already included in any of the groupings represented by the progress meters 432. For example, since the "always active" compliance period type does not make use of completion status for those conditions of approval (e.g., as they are always applicable), all of the "always active" type conditions of approval are represented by this other conditions meter 434. The other conditions meter 434, in the example embodiment, includes a total number of conditions of approval falling under this grouping, but does not include a dial showing aggregate completion progress. The other conditions meter 434 may similarly include user interactable actions that similarly allows the users 142, 152 to see details of those particular conditions of approval 204.

FIG. 4B is a group conditions screen 440 that is displayed on the user interface 128 after the user 142, 152 activates one of the progress meters 432 in the dashboard 430 of the overview screen 420 shown in FIG. 4A. In some embodiments, the group conditions screen 440 may be similar to the conditions of approval screen 320 shown in FIG. 3B. In this example embodiment, the user 142, 152, has activated the "prior to permit application" progress meter 432A. In response, the form management service 124 identifies all of the conditions of approval for this compliance period type (e.g., filtering on compliance period type) and displays a list 442 of those conditions of approval 204. Each entry in the list 442 includes a title 322 and a summary description 324, and a "show more" link 340, similar to the entries in list 318 of FIG. 3B.

In addition, in the example embodiment, each entry also includes source planning application data 444, completion status data 446, and a resolution comments field 448. The source planning application data 444 displays an identifier for the planning application 202 that is associated with this permit application 206. The source planning application data 444 may also include a user-interactable link that, when activated, causes the interface 128 to display the planning application 202 (e.g., the planning application overview screen 310). The completion status data 446 identifies the current status of this particular condition of approval 204. In this example, the completion status data 446 is represented by a user-interactable toggle button that can be changed between "complete" and "incomplete." The resolution comments field 448 is a text field that allows the user 142, 152 to enter notes regarding the status of this condition of approval (e.g., when the condition was marked as complete, who marked the condition as complete, why the condition is not yet complete, or the like). The user 142, 152 may edit and save the completion status data 446 and the comments field 448 of this condition of approval on this screen 440. Further, like the list 318 of FIG. 3B, the "show more" link 340, when activated by the user 142, 152, may display a condition details screen (e.g., similar to the condition editor screen 370 shown in FIG. 3D) that allows the user 142, 152 to view additional details of this particular condition of approval.

In some embodiments, the smart form management system 100 provides automatic updating functionality for completion status of conditions of approval. For example, in some embodiments, the form management service 124 may communicate with the third-party service 160 shown in FIG. 1. The third-party service 160 may transmit messages to the form management service 124 (e.g., emails, API messages, or the like) when, for example, work items are completed. For example, a developer or an inspection firm may maintain their own third-party workflow system that manages work items for their subordinates, and some of those work items may be associated with projects managed by the form management service 124 (e.g., the example permit application 206). When a technician or inspector for the third-party firm completes a work item for which they are responsible, the technician may update their third-party system with a completion status. In turn, the third-party service 160 may transmit a status update message to the form management service 124 (e.g., via an exposed API, not shown) that indicates completion of a particular task associated with the permit application 206. The status update message may include any or all of, for example, an application ID of the permit application 206 (e.g., identifying the application 206 associated with the work item), a condition of approval ID of a condition of approval 204 (e.g., identifying a particular condition of approval 204 assigned to the permit application 206 and for which this work item is associated), and completion status data (e.g., completion status, completion notes, assigned worker, completion date/time, and the like).

In some embodiments, the status update message may be an email message from the third-party service 160. For example, the third-party service 160 may transmit a formatted email to the form management service 124 when a work item is completed. The email may, similarly, include an application ID, a condition of approval ID, and completion status data (e.g., within subject line, email body, or the like).

Accordingly, upon receipt of the status update message, the form management service 124 identifies the particular condition of approval 204 within the permit application 206 and automatically updates the condition of approval 204 based on the completion status data received from the third-party service 160.

In some embodiments, automatic updating functionality for completion status of conditions of approval may be provided via a programmable framework configured by the users 142. The admin interface 126 may, for example, provide a programmatic interface through which the user 142 may configure automatic completion criteria, or programming that automatically updates such completion criteria upon execution, thereby allowing the user 142 to configure when certain conditions of approval 204 automatically resolve. For example, one condition of approval 204 may direct the applicant to obtain an inspection from a planning division prior to occupancy or final building inspection. As such, this condition of approval 204 may be configured to automatically complete when an inspection of "Inspection Type=Planning" is scheduled in the system 100. In another example, a condition of approval 204 may direct the applicant to pass a final inspection. As such, this condition of approval 204 may be automatically completed when an inspection result is received by the system 100 with an "Inspection Type=Final" and an "Inspection Result=Passed."

6. Additional Example User Interface Screens

Figure 5A:
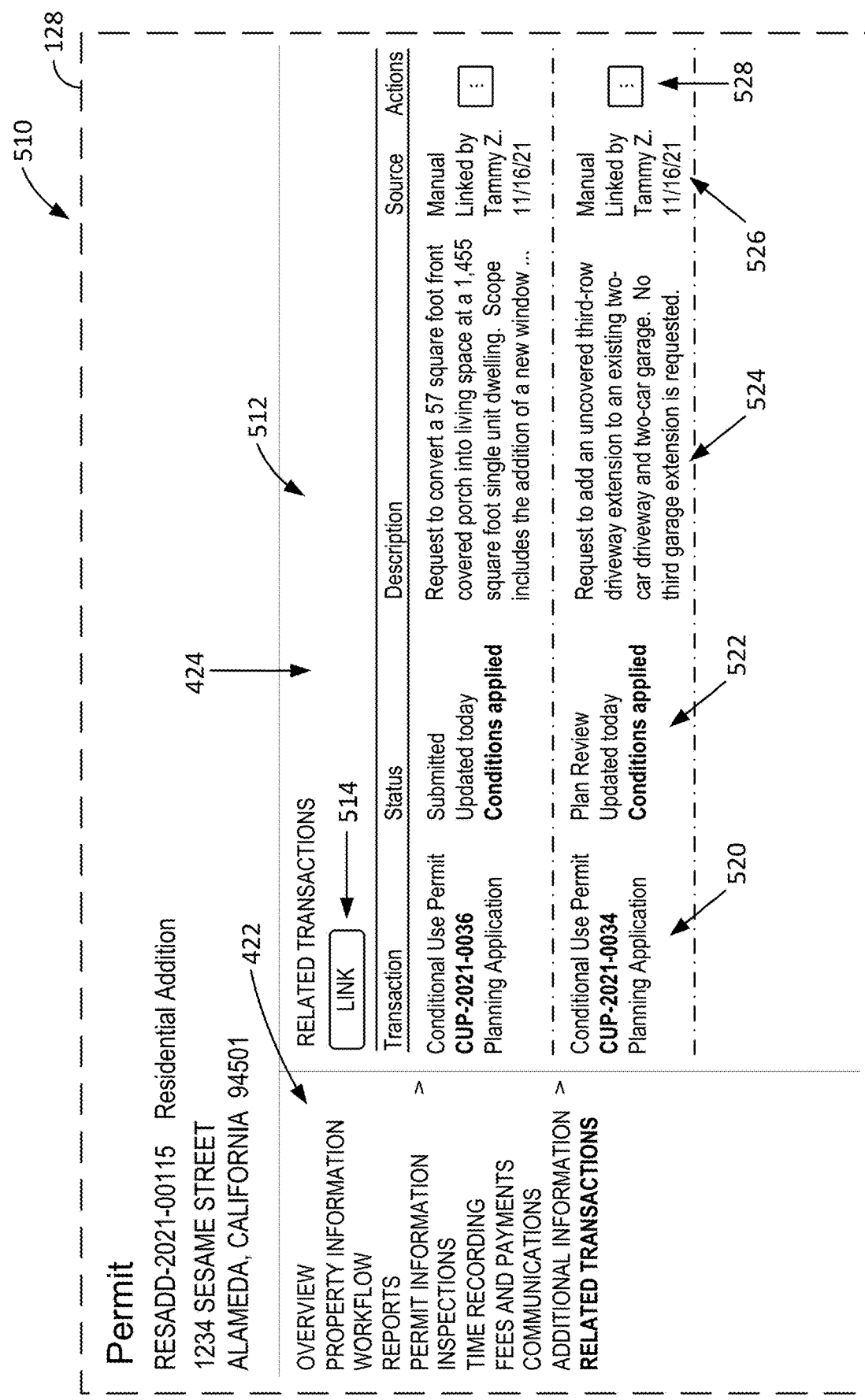
FIG. 5A is a related transactions screen that is displayed on the user interface after the user selects a related transactions tab in the navigation pane of the overview screen shown in FIG. 4A.

FIG. 5A is a related transactions screen 510 that is displayed on the user interface 128 after the user 142, 152 selects a related transactions tab in the navigation pane 422 of the overview screen 420 shown in FIG. 4A. In the example embodiment, the related transactions screen 510 is used to show relationships between the current permit application 206 and any other linked applications (the "related transactions"), such as the associated planning application 202 for this project. When the user 142, 152 selects the related transactions tab 436, the form management service 124 displays a list 512 of related applications in the page details pane 424.

In the example embodiment, the current permit application 206 is linked to two other applications. The first entry in this list is the parent planning application 202 described in the current example (e.g., a conditional use permit request for converting an exterior porch into an interior living space for a residential property). The second entry in this list is another planning application related to this same residential property (e.g., for adding an extension to a driveway of the property). Each entry in the list 512 includes transaction information 520 for the related application (e.g., unique form ID, form type, form use), status information 522 (e.g., submission status, last updated status, conditions information), description information 524 (e.g., a summary description of the application), and source information 526 (e.g., how the application is related, who linked the application to this permit 206). Further, each entry in the list may be user-interactable (e.g., user-selectable), allowing the user to access that application by, for example, clicking on the unique form ID in the transaction information 520 or choosing to display this transaction from a drop-down actions menu 528.

FIG. 5B is a transaction selection screen 530 that is displayed on the user interface 128 after the user 142, 152 selects a link button 514 on the related transactions screen 510 shown in FIG. 5A. In some embodiments, the form management service 124 allows users 142, 152 to manually link applications using the link button 514. Upon activating the link button 514, the form management service 124 displays a list 532 of applications from the forms database 134. This list 532 allows the user 142, 152 to, for example, browse a list of applications and select which application(s) to link to the current permit application 206 (e.g., via selection toggles 534 and a save or apply feature). Such relationships may be stored as a part of the permit application 206, as a part of the linked application, or both. In the example embodiment, the user 142, 152 has selected an example transaction 536 by selecting the particular toggle 534 for that transaction 536. When a new linkage is created, the list 512 is updated accordingly.

Figure 5C:
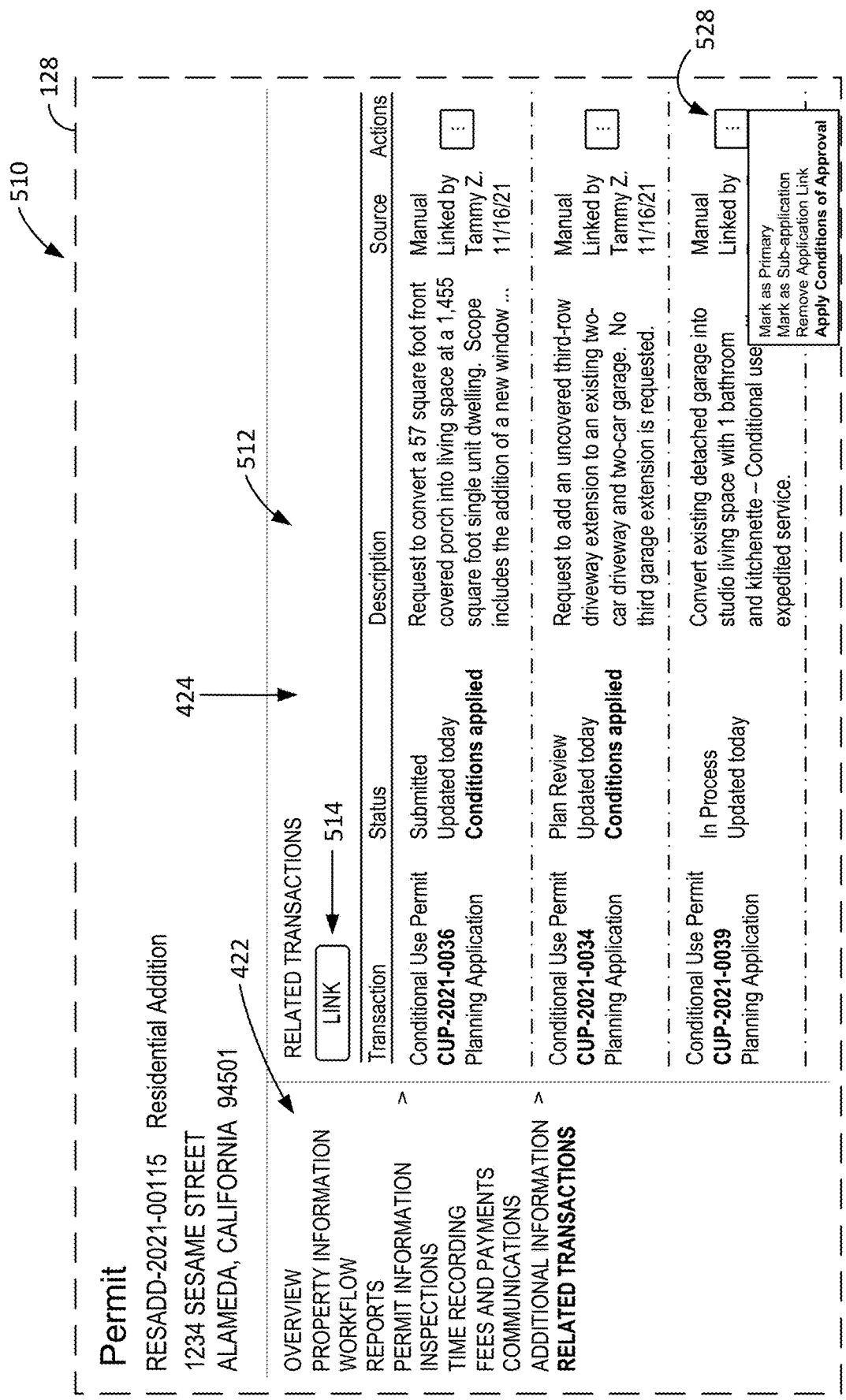
FIG. 5C is the related transactions screen after the user has selected and linked a third application to the current permit application using the transaction selection screen shown in FIG. 5B.

FIG. 5C is the related transactions screen 510 after the user 142, 152 has selected and linked a third application to the current permit application 206 using the transaction selection screen 530 shown in FIG. 5B. In some embodiments, the current permit application 202 may inherit or otherwise have been assigned one or more conditions of approval 204 based on the linkage to the applications in this list 512. For example, the parent planning application 202 may be automatically linked to this permit application 206 when the permit application 206 was created at operation 220. In this example, the second related application was manually linked to the parent planning application 202 of this permit application 206 by a city planner because the applications both relate to the same residential property, and the linkage from the parent planning application 202 to that other application was inherited by this permit application 206 when the permit application 206 was created.

Some or all conditions of approval 204 from linked applications may be inherited, copied, or otherwise assigned to the permit application 206 when linked. In some embodiments, when an application is initially linked to an application, such as this example permit application 206, all of the conditions of approval 204 from the linked application may be assigned to the permit application 206. In the example embodiment, after the third application was manually linked to this permit application 206, the user 142, 152 may determine which conditions of approval 204 to assign from the third application into this permit application 206. For example, the user 142, 152 may select (e.g., click on) an "apply conditions of approval" menu item provided under the drop-down actions menu 528.

FIG. 5D is a conditions selection screen 540 that is displayed on the user interface 128 after the user 142, 152 selects the "apply conditions of approval" menu item from the drop-down actions menu 528 shown in FIG. 5C. In the example embodiment, selection of the "apply conditions of approval" menu item causes the form management service 124 to display a list 542 of all of the conditions of approval 204 from the linked application. Each condition of approval entry in the list 542 includes a title and summary 544, a "see more" link 546 (e.g., to display additional details about the condition), completion period information 548, and a condition selection toggle 550. From this displayed list 542, the user 142, 152 may select which conditions of approval 204 from the linked application to apply to the current permit application 206. The user 142, 152 may select individual conditions using the individual toggles 550 in each entry, or may use a "select all" toggle 552 to select all of the conditions of approval for assignment. Once selection is complete and saved, the selected conditions of approval 204 will be included in the set of conditions of approval 204 for this permit application 206. Such "linked conditions of approval" may, in some embodiments, be included when aggregating progress status and displaying the progress meters 432 shown in FIG. 4A.

In some embodiments, the form management service 124 uses machine learning and artificial intelligence methods to automatically assign conditions of approval 204, or provide recommendations as to which conditions of approval 204 to assign, to an application 202, 206. For example, the form management service 124 may train a machine learning model (not shown) to score the various pre-defined conditions of approval stored in the library as to how likely those particular conditions of approval are to be of applicability to the present application 202, 206. The machine learning model may be trained using the existing set of form instances 114 (e.g., pending or complete planning application 202 and/or permit applications 206) as training data (e.g., as labeled training data indicating which applications used the various pre-defined conditions). The model training may use inputs from the training applications such as, for example, application type data (e.g., building permit, mechanical permit), project data (e.g., internal modifications, external modifications), property data (e.g., zoning data, address, municipality), applicant data (e.g., commercial or residential), fee amount, or the like. The model may be trained to score a particular input application against the various conditions of approval within the library, where higher scoring conditions of approval indicate that those conditions of approval are more likely to be of interest (e.g., likely to be assigned to) the input application.

During the planning phase 210, the form management service 124 may use the trained model to evaluate which conditions of approval form the library are of potential interest to include in the input planning application 202. For example, the form management service 124 may use a preconfigured score threshold to identify a set of conditions of approval to suggest for inclusion, or to automatically include, in the planning application 202 (e.g., all conditions in the library above the preconfigured score threshold). Accordingly, use of the machine learning model allows the form management service 124 to present pre-configured conditions of approval for assignment to the permit application 202.

FIG. 6 is a condition reordering screen 600 provided by the interfaces 126, 128 of the form management service 124 that allows users 142, 152 to administer ordering of the conditions of approval 204 shown in FIG. 2. In some scenarios, the ordering of the conditions of approval 204 may be significant to some of the users 142, 152. For example, at various stages of the project, the form management service 124 may be configured to generate reports that include details about the conditions of approval, and the users 142, 152 may wish to dictate the order in which the conditions of approval 204 appear within that report. Accordingly, in the example embodiment, the condition reordering screen 600 provides a reordering feature to the users 142, 152 for the conditions of approval 204 by activating the reorder button 350 from the conditions of approval screen 320 shown in FIG. 3B.

Upon activating the reorder button 350, the form management service 124 displays the condition reordering screen 600 shown in FIG. 6. In the example embodiment, the condition reordering screen 600 includes a list 602 of conditions of approval. Each entry in the list 602 displays a title and brief summary 610, a type 612, a category 614 and a subcategory 616 of the condition of approval. The condition reordering screen 600 allows the users 142, 152 to reorder the conditions in the list 602 by selecting an individual entry or a set of adjacent entries, dragging the entry(s) up or down the list 602 and releasing the selected entry(s) when the desired destination is achieved. In some embodiments, the list 602 is redrawn as the user drags the selection(s) up and down the list, thereby providing a visual cue as to the current destination location before the user releases the selection and completes the reordering action. The user 142, 152 may, additionally or alternatively, select one or more conditions in the list 602 and use arrow icons 620 to, for example, move the selections up or down one or more positions, or to the beginning or end of the list 602. Once the user 142, 152 has performed all of the reordering desired, the order of the entries may be saved for later use.

In the example embodiment, the form management service 124 tracks the ordering of the conditions of approval using unique IDs and an order list. More specifically, and for example, each condition of approval 204 is assigned a unique ID specific to that particular condition of approval and to this permit application 206 or planning application 202 (e.g., when initially assigned to the application, or if currently unassigned, then upon entry into this screen 600). The order list may be, for example, an array of condition IDs, where each condition of approval 204 for this permit application 206 appears once somewhere in the list. The unique IDs for each condition of approval are initially established in the order list based on, for example, an initial (e.g., arbitrary) order, the order in which the conditions were added to the permit application 206, or the like. The order list is stored with the permit application 206 and may be changed as conditions are reordered by the users 142, 152. In some embodiments, each conditions of approval 204 also includes a print sequence attribute (e.g., integer value defining a print position) which, collectively for all of the conditions of approval 204 for this application 202, 206, may be used as the order list. For example, when a new condition of approval 204 is added, that condition of approval 204 may be added to the end of the list by assigning the print sequence attribute of the new condition of approval 204 with the next highest number (e.g., based on the existing conditions of approval 204). As conditions of approval 204 are removed from the application 202, 206, the form management service 124 may update the print sequence attributes of the remaining conditions of approval 204 (e.g., moving later conditions up to fill the gap made by the removed condition). Similarly, as conditions are moved within the condition reordering screen 600, the form management service 124 may update the print sequence attributes of the conditions of approval 204 to reflect the new order.

In the example embodiment, the condition reordering screen 600 displays the list 602 of conditions of approval 204 based on the order list (e.g., with the first condition in the order list appearing first in the list 602, and so on). As the user 142, 152 moves conditions 204 within the list 602, the form management service 124 identifies which conditions are being selected to move (e.g., by the unique condition ID of the selected entry(s)) and the destination location of the move (e.g., before or after other another particular condition, also based on the unique condition ID). To reflect this change in ordering, the form management service 124 removes the entry(s) from their original location in the order list, moves all conditions up in the list until the destination location is reached, and then inserts the moved entry into the destination location in the order list. As such, the displayed list 602 reflects the stored order list, both before and after any move actions.

In some embodiments, conditions of approval 204 within the list 602 may be ordered or reordered by condition type, category, and/or subcategory. In some embodiments, the report may include project data (e.g., transaction ID, transaction location, transaction type (e.g., use permit, solar permit), transaction description, project planner, or the like) and/or conditions of approval data (e.g., condition, condition type (e.g., standard, custom), condition category (e.g., an agency-defined category), condition subcategory (e.g., an agency-defined subcategory), condition update time, condition print sequence, or the like).

When the user 142, 152 generates a report (e.g., using the generate report 356 button shown in FIG. 3B) that includes the conditions of approval 204 for that application 202, 206, the form management service 124 uses the order list, or the print sequence attributes of the conditions of approval 204, to determine the order in which the conditions of approval 204 appear in the list. For example, the report generation may include creating an electronic output file (e.g., PDF, editable text document, or the like) or printing a physical copy of the report that includes data fields from the conditions of approval 204, with the conditions of approval 204 appearing based at least in part on the ordering defined by the order list or the print sequence attributes.

While the above example screens shown in FIGS. 3A-6 are described with respect to one or the other of the admin interface 126 or the user interface 128, it should be understood that either of the interfaces 126, 128 may provide any of the screens shown, and associated functionality.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field-programmable gate arrays (FPGAs), or network processing units (NPUs) that are persistently programmed to perform the techniques, or may include one or more hardware processors programmed to perform the techniques pursuant to program instructions in firmware, memory, other storage, or in combination. Such special-purpose computing devices may also combine custom hardware-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 7:
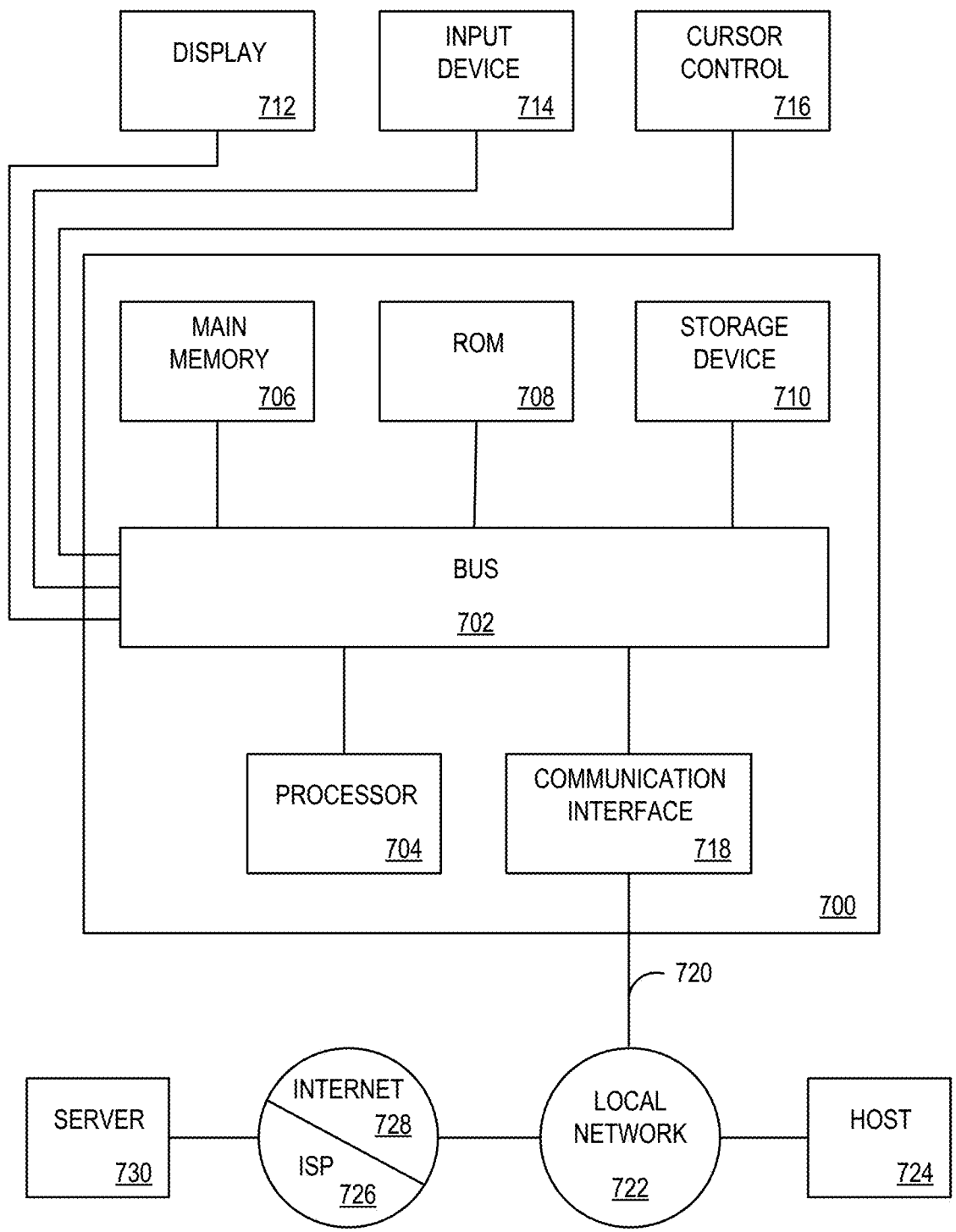
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a central processing unit (CPU) microprocessor.

Computer system 700 also includes a main memory 706 such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 702. Transmission media can also take the form of acoustic or light waves, such as those generated during radio-wave and infra-red data communications.

Various forms of media may be involved in carrying one or more instructions to processor 704 for execution. For example, the instructions may initially be carried on a magnetic disk or solid state drive of a remote computer. The remote computer can load the instructions into the remote computer's dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through Internet 728, ISP 726, local network 722, and communication interface 718. The received code may be executed by processor 704 as the code is received, and/or stored in storage device 710, or other non-volatile storage for later execution.

Figure 8:
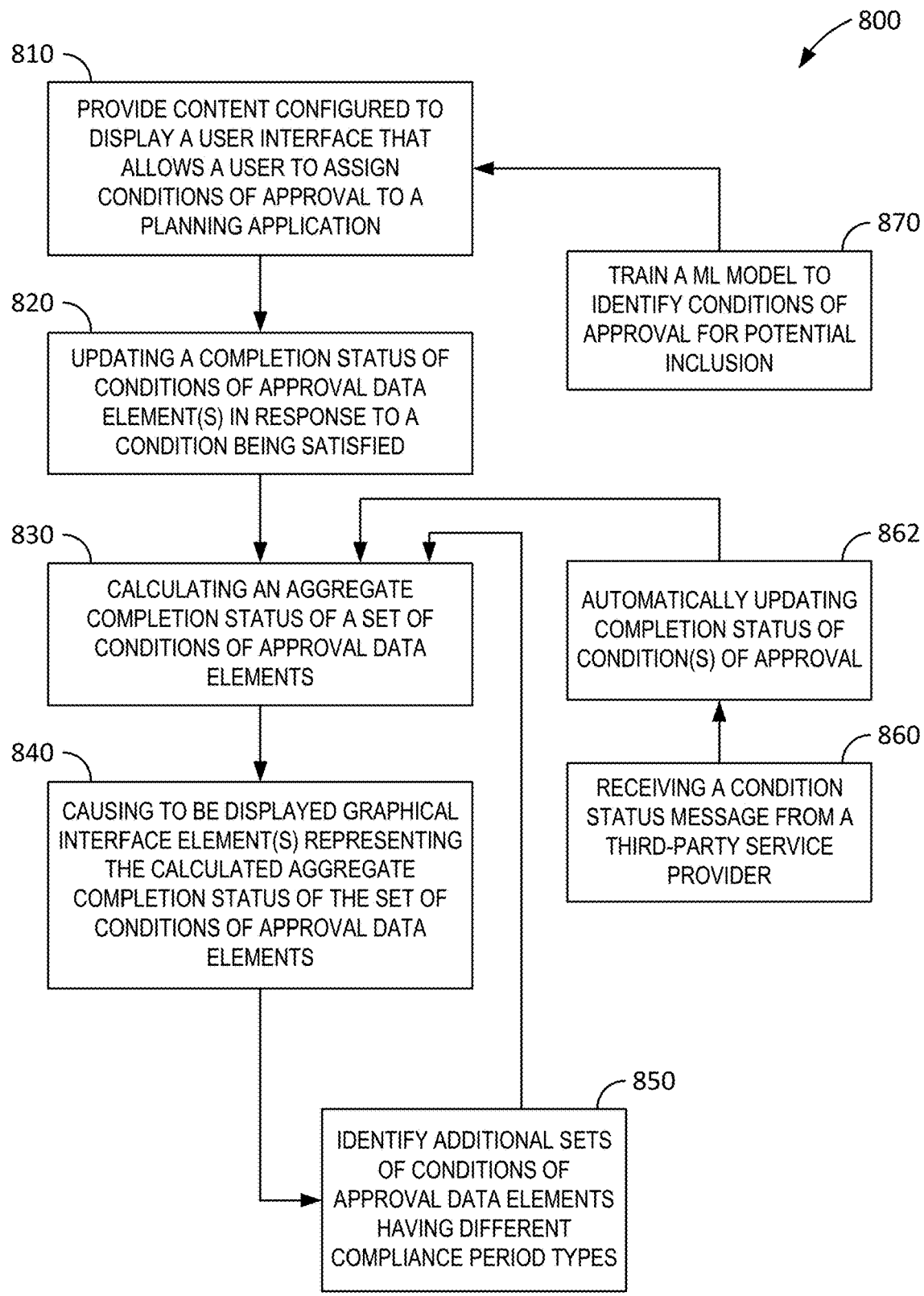
FIG. 8 is a flow chart of an example method for providing graphical user interface elements in a user interface.

FIG. 8 is a flow chart of an example method 800 for providing graphical user interface elements in a user interface. In some embodiments, the method 800 may be performed by one or more of the computing devices 122, 144, 154, 162 shown in FIG. 1 to provide the progress meters 432 shown in FIG. 4A. In the example embodiment, the method 800 includes providing content configured to cause to be displayed a user interface (UI), the user interface being configured to enable a user to assign a plurality of conditions of approval data elements to a planning application, each condition of approval data element of the plurality of conditions of approval data elements including a completion status and one or more conditions to which a permit application is subject during a permitting phase (Operation 810). The user interface may be similar to the admin interface 126 or the user interface 128 shown in FIGS. 1 and 3A-5D. The providing content in Operation 810 may include, for example, transmitting web browser-interpretable instructions (e.g., html, JavaScript, or the like) that, when processed by a browser application local to the receiving computing device 144, 154, causes the UI to be presented (e.g., displayed) to the user 142, 152 on their local device (e.g., displaying the screens shown in FIGS. 3A-6. This architecture may be referred to herein as a web-based or browser-based architecture, where the instructions for the UI are represented as interfaces 126, 128 of the form management service 124 shown in FIG. 1, for example. In client/server embodiments, the receiving computing device 144, 154 may have a client-side application locally installed that presents aspects of the UI. As such, the providing content in Operation 810 may include transmitting data to the computing device 144, 154 that is used by the client-side application to present the screens shown in FIGS. 3A-6. It should be understood that the various operations that provide content is configured to cause something to be displayed in the systems and methods described herein can operate in the web-based architecture, the client/server-based architecture, or any such similar technology.

The method 800 also includes updating a completion status of at least one condition of approval data element of the plurality of conditions of approval data elements in response to a condition being satisfied (Operation 820). The method 800 further includes calculating an aggregate completion status of a set of conditions of approval data elements (Operation 830). In some embodiments, each condition of approval data element of the plurality of conditions of approval data elements further includes compliance period data identifying a deadline when an associated condition of approval is to be completed, and calculating the aggregate completion status of the set of conditions of approval data elements includes identifying the set of conditions of approval data elements to include in the aggregation based at least in part on the compliance period data. The method 800 also includes providing content that is configured to cause to be displayed at least one graphical interface element representing the calculated aggregate completion status of the set of conditions of approval data elements (Operation 840).

In some embodiments, the method 800 includes identifying one or more additional sets of conditions of approval data elements based on the compliance period data, each of the one or more additional sets of conditions of approval data elements having a compliance period type different than the set of conditions of approval data elements (Operation 850), calculating an aggregate completion status for each of the one or more additional sets of conditions of approval data elements (Operation 830), and causing to be displayed an additional graphical interface element for each of the one or more additional sets of conditions of approval data elements representing the calculated aggregate completion status of the associated set of conditions of approval data elements (Operation 840).

In some embodiments, the graphical interface element includes a circular dial (e.g., similar to the progress meters 432 shown in FIG. 4A), and calculating the aggregate completion status at Operation 830 further includes calculating a percentage of completed conditions of approval from the set of conditions of approval data elements based on completion status, and causing to be displayed the graphical interface element further includes shading a circumferential portion of the circular dial by the percentage. In some embodiments, the graphical interface element includes a user-interactable action that, when activated by user input, is configured to display a conditions list that includes the set of conditions of approval.

In some embodiments, the method 800 includes receiving, from a third-party service provider, a condition status message associated with the permit application (Operation 860) and automatically updating completion status of at least one condition of approval based at least in part on the condition status message (Operation 862).

In some embodiments, calculating an aggregate completion status at Operation 830 further includes calculating a first aggregate completion status using all conditions of approval within the set of conditions of approval data elements assigned to a first user identity and a second aggregate completion status using the remaining conditions of approval within the set of conditions of approval data elements, and causing to be displayed the at least one graphical interface element at Operation 840 further includes causing to be displayed the at least one graphical interface element including a first portion representing completed conditions of approval assigned to the first user identity, a second portion representing incomplete conditions of approval assigned to the first user identity, and one or more additional portions representing conditions of approval not assigned to the first user identity.

In some embodiments, the method 800 includes training a machine learning model to identify a subset of pre-configured conditions of approval from a library of pre-configured conditions of approval for potential inclusion in the planning application, the training uses a historical set of applications as labeled training data to train the machine learning model to score relevance of pre-configured conditions of approval to an input application, applying application data of the planning application to the machine learning model, thereby generating a relevance score for each pre-configured condition of approval, and identifying a subset of the pre-configured conditions of approval by comparing the generated relevance score against a predetermined threshold and displaying a list of prospective conditions of approval to users for potential inclusion in the planning application (Operation 870).

Figure 9:
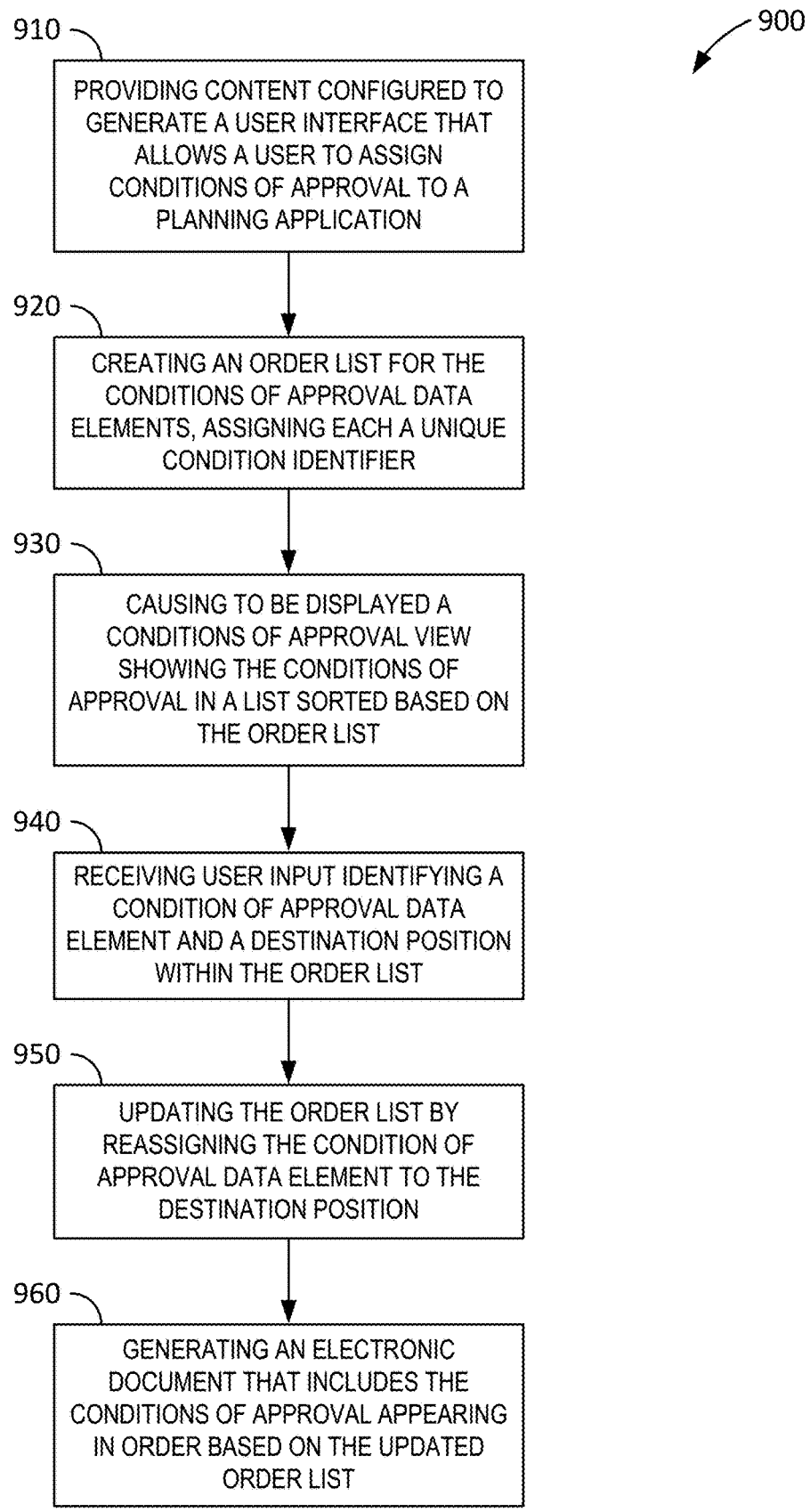
FIG. 9 is a flow chart of an example method for ordering conditions of approval.

FIG. 9 is a flow chart of an example method 900 for ordering conditions of approval. In some embodiments, the method 900 may be performed by one or more of the computing devices 122, 144, 154, 162 shown in FIG. 1 to provide the condition reordering screen 600 shown in FIG. 6. In the example embodiment, the method 900 includes providing content configured to cause to be displayed a user interface (UI) that is configured to enable a user to assign a plurality of conditions of approval data elements to a planning application, each condition of approval data element of the plurality of conditions of approval data elements including one or more conditions of approval to which a permit application is subject during a permitting phase (Operation 910). Operation 910 may be performed in a web-based architecture, a client/server-based architecture, or the like, as described above with respect to Operation 810 of FIG. 8.

The method 900 also includes creating an order list for the plurality of conditions of approval data elements causing each conditions of approval data element to be assigned a unique condition identifier (ID) (Operation 920). The method further includes providing content configured to cause to be displayed a conditions of approval view showing the plurality of conditions of approval data elements in a list sorted based at least in part on the order list, the conditions of approval view allowing individual conditions of approval data elements to be selected and moved within the list based on user input (Operation 930). The method 900 also includes receiving first user input identifying a first condition of approval data element and a destination position within the order list (Operation 940) and updating the order list by reassigning the first condition of approval data element to the destination position in the order list (Operation 950). The method 900 further includes generating an electronic document that includes the plurality of conditions of approval appearing within the electronic document in order based on the updated order list, each condition of approval (Operation 960).

In some embodiments, each condition of approval includes a condition definition formatted in a rich text format, and generating the electronic document at Operation 960 further includes adding condition definitions in rich text format into the electronic document. In some embodiments, the planning application includes a link to another application from which the planning application shares at least one inherited condition of approval, and the order list includes the at least one inherited condition of approval. In some embodiments, the method 900 further includes providing a condition selection UI that displays a list of conditions of approval from the other application, identifying, based on user input, a selection of one or more conditions of approval from the condition selection UI, and assigning the selected conditions of approval to the planning application.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An electronic form management system comprising:
at least one processor executing instructions that are configured to cause the at least one processor to:
provide first content configured to cause to be displayed a user interface (UI) accessible to a first user, the user interface comprising a plurality of conditions of approval data elements corresponding to different compliance periods of a project managed by a cloud software planning application, each conditions of approval data element of the plurality of conditions of approval data elements including a completion status and two or more conditions for which compliance depends on a corresponding compliance period of the different compliance periods of the project; wherein at least a first condition of a particular conditions of approval data element associated with a particular compliance period is assigned to the first user of the cloud software planning application and at least a second condition of the particular conditions of approval data element associated with the particular compliance period is assigned to a second user of the cloud software planning application; wherein the first condition is accessible for update by the first user in the cloud software planning application and the second condition is accessible for update by the second user in the cloud software planning application;
receive, via user input to the cloud software planning application, a second update to the second condition from the second user;
receive, automatically via an application programming interface (API) from a third-party service provider other than the cloud software planning application, a condition status message associated with the project, wherein the condition status message identifies at least one condition of the particular conditions of approval data element associated with the particular compliance period;
in response to the condition status message, automatically update a completion status of the at least one condition of the particular conditions of approval data element associated with the particular compliance period;
calculate an aggregate completion status of a set of conditions for the particular conditions of approval data element associated with the particular compliance period to include the second update to the second condition from the second user and the automatic update of the completion status; wherein the aggregate completion status comprises a percentage determined from the set of conditions of approval completed; and provide second content configured to cause to be displayed at least one selectable graphical interface element graphically representing the calculated aggregate completion status of the set of conditions for the particular conditions of approval data element associated with the particular compliance period concurrently with one or more other selectable graphical interface elements graphically representing one or more other aggregate completion statuses of one or more other sets of conditions of one or more other conditions of approval data elements associated with one or more other compliance periods;

receive a selection of the at least one selectable graphical interface element;

in response to the selection of the at least one selectable graphical interface element, cause display of an option for the first user to update the first condition of the particular conditions of approval data element associated with the particular compliance period;

update the first condition and the aggregate completion status in response to a selection of the option by the first user.

2. The electronic form management system of claim 1, wherein each conditions of approval data element of the plurality of conditions of approval data elements further includes compliance period data identifying a deadline when an associated set of conditions is to be completed, wherein calculating the aggregate completion status of the set of conditions includes identifying the set of conditions to be included in an aggregation based at least in part on the compliance period data.

3. The electronic form management system of claim 2, wherein the instructions are further configured to cause the at least one processor to:

identify the one or more other sets of conditions of the one or more other conditions of approval data elements associated with the one or more other compliance periods based on the compliance period data for the one or more other compliance periods, each of the one or more other compliance periods having a compliance period type different than the particular compliance period;

calculate the one or more other aggregate completion statuses by calculating an aggregate completion status for each of the one or more other sets of conditions of the one or more other conditions of approval data elements associated with the one or more other compliance periods; and update the one or more other selectable graphical interface elements representing the one or more other aggregate completion statuses in response to one or more updates to the one or more other aggregate completion statuses determined from re-calculating the one or more other aggregate completion statuses.

4. The electronic form management system of claim 1, wherein the at least one selectable graphical interface element includes a circular dial, wherein calculating the aggregate completion status further includes calculating a percentage of completed conditions from the set of conditions based on one or more updated completion statuses, wherein the second content is further configured to cause the at least one selectable graphical interface element to include shading of a circumferential portion of the circular dial by the percentage.

5. The electronic form management system of claim 1, wherein the at least one selectable graphical interface element includes a user-interactable action that, when activated by user input, is configured to cause to be displayed a conditions list that includes the set of conditions of the particular conditions of approval data element.

6. The electronic form management system of claim 1, wherein calculating the aggregate completion status further includes calculating a first aggregate completion status using all conditions within the set of conditions that are assigned to a first user identity of the first user and a second aggregate completion status using remaining conditions within the set of conditions, wherein the second content is further configured to cause to be displayed the at least one selectable graphical interface element including a first portion representing completed conditions assigned to the first user identity, a second portion representing incomplete conditions assigned to the first user identity, and one or more additional portions representing conditions not assigned to the first user identity.

7. The electronic form management system of claim 1, wherein the instructions are further configured to cause the at least one processor to:

train a machine learning model to identify a subset of pre-configured conditions from a library of pre-configured conditions for potential inclusion in the plurality of conditions of approval data elements for the cloud software planning application; wherein the training uses a historical set of projects as labeled training data to train the machine learning model to score relevance of pre-configured conditions of approval to an input project;

apply project data of the cloud software planning application to the machine learning model, thereby generating a relevance score for each pre-configured condition; and identify a subset of the pre-configured conditions by comparing the generated relevance score against a predetermined threshold.

8. A computer-implemented method comprising:

providing first content configured to cause to be displayed a user interface (UI) accessible to a first user, the user interface comprising a plurality of conditions of approval data elements corresponding to different compliance periods of a project managed by a cloud software planning application, each conditions of approval data element of the plurality of conditions of approval data elements including a completion status and two or more conditions for which compliance depends on a corresponding compliance period of the different compliance periods of the project; wherein at least a first condition of a particular conditions of approval data element associated with a particular compliance period is assigned to the first user of the cloud software planning application and at least a second condition of the particular conditions of approval data element associated with the particular compliance period is assigned to a second user of the cloud software planning application; wherein the first condition is accessible for update by the first user in the cloud software planning application and the second condition is accessible for update by the second user in the cloud software planning application;

receiving, via user input to the cloud software planning application, a second update to the second condition from the second user;

receiving, automatically via an application programming interface (API) from a third-party service provider other than the cloud software planning application, a condition status message associated with the project, wherein the condition status message identifies at least one condition of the particular conditions of approval data element associated with the particular compliance period;

in response to the condition status message, automatically updating a completion status of the at least one condition of the particular conditions of approval data element associated with the particular compliance period;

calculating an aggregate completion status of a set of conditions for the particular conditions of approval data element associated with the particular compliance period to include the second update to the second condition from the second user and the automatic update of the completion status; wherein the aggregate completion status comprises a percentage determined from the set of conditions completed; and providing second content configured to cause to be displayed at least one selectable graphical interface element graphically representing the calculated aggregate completion status of the set of conditions for the particular conditions of approval data element associated with the particular compliance period concurrently with one or more other selectable graphical interface elements graphically representing one or more other aggregate completion statuses of one or more other sets of conditions of one or more other conditions of approval data elements associated with one or more other compliance periods;

receiving a selection of the at least one selectable graphical interface element;

in response to the selection of the at least one selectable graphical interface element, causing display of an option for the first user to update the first condition of the particular conditions of approval data element associated with the particular compliance period;

updating the first condition and the aggregate completion status in response to a selection of the option by the first user.

9. The method of claim 8, wherein each condition of approval data element of the plurality of conditions of approval data elements further includes compliance period data identifying a deadline when an associated set of conditions is to be completed, wherein calculating the aggregate completion status of the set of conditions of includes identifying the set of conditions of to included in an aggregation based at least in part on the compliance period data.

10. The method of claim 9 further comprising:
identifying the one or more other sets of conditions of the one or more other conditions of approval data elements associated with the one or more other compliance periods based on the compliance period data for the one or more other compliance periods, each of the one or more other compliance periods having a compliance period type different than the particular compliance period;

calculating the one or more other aggregate completion statuses by calculating an aggregate completion status for each of the one or more other sets of conditions of the one or more other conditions of approval data elements associated with the one or more other compliance periods; and update the one or more other selectable graphical interface elements representing the one or more other aggregate completion statuses in response to one or more updates to the one or more other aggregate completion statuses determined from re-calculating the one or more other aggregate completion statuses.

11. The method of claim 8, wherein the at least one selectable graphical interface element includes a circular dial, wherein calculating the aggregate completion status further includes calculating a percentage of completed conditions from the set of conditions based on one or more updated completion statuses, wherein the second content is further configured to cause the at least one selectable graphical interface element to include shading of a circumferential portion of the circular dial by the percentage.

12. The method of claim 8, wherein the at least one selectable graphical interface element includes a user-interactable action that, when activated by user input, is configured to cause to be displayed a conditions list that includes the set of conditions of the particular conditions of approval data element.

13. The method of claim 8, wherein calculating the aggregate completion status further includes calculating a first aggregate completion status using a first subset of conditions within the set of conditions that are assigned to a first user identity of the first user and a second aggregate completion status using a second subset of conditions within the set of conditions, wherein the second content is further configured to cause to be displayed the at least one selectable graphical interface element including a first portion representing completed conditions assigned to the first user identity, a second portion representing incomplete conditions assigned to the first user identity, and one or more additional portions representing conditions not assigned to the first user identity.

14. The method of claim 8 further comprising:
training a machine learning model to identify a subset of pre-configured conditions from a library of pre-configured conditions for potential inclusion in the plurality of conditions of approval data elements for the cloud software planning application; wherein the training uses a historical set of projects as labeled training data to train the machine learning model to score relevance of pre-configured conditions of approval to an input project;

applying project data of the cloud software planning application to the machine learning model, thereby generating a relevance score for each pre-configured condition; and identifying a subset of the pre-configured conditions by comparing the generated relevance score against a predetermined threshold.

15. A non-transitory computer-readable medium storing instructions that, when executed by at least one processor, are configured to cause the at least one processor to:
provide first content configured to cause to be displayed a user interface (UI) accessible to a first user, the user interface comprising a plurality of conditions of approval data elements corresponding to different compliance periods of a project managed by a cloud software planning application, each conditions of approval data element of the plurality of conditions of approval data elements including a completion status and one two or more conditions for which compliance depends on a corresponding compliance period of the different compliance periods of the project; wherein at least a first condition of a particular conditions of approval data element associated with a particular compliance period is assigned to the first user of the cloud software planning application and at least a second condition of the particular conditions of approval data element associated with the particular compliance period is assigned to a second user of the cloud software planning application;

wherein the first condition is accessible for update by the first user in the cloud software planning application and the second condition is accessible for update by the second user in the cloud software planning application;

receive, via user input to the cloud software planning application, a second update to the second condition from the second user;

receive, automatically via an application programming interface (API) from a third-party service provider other than the cloud software planning application, a condition status message associated with the project, wherein the condition status message identifies at least one condition of the particular conditions of approval data element associated with the particular compliance period;

in response to the condition status message, automatically update a completion status of the at least one condition of the particular conditions of approval data element associated with the particular compliance period;

calculate an aggregate completion status of a set of conditions for the particular conditions of approval data element associated with the particular compliance period to include the second update to the second condition from the second user and the automatic update of the completion status; wherein the aggregate completion status comprises a percentage determine from the set of conditions completed; and provide second content configured to cause to be displayed at least one selectable graphical interface element graphically representing the calculated aggregate completion status of the set of conditions for the particular conditions of approval data element associated with the particular compliance period concurrently with one or more other selectable graphical interface elements graphically representing one or more other aggregate completion statuses of one or more other sets of conditions of one or more other conditions of approval data elements associated with one or more other compliance periods;

receive a selection of the at least one selectable graphical interface element;

in response to the selection of the at least one selectable graphical interface element, cause display of an option for the first user to update the first condition of the particular conditions of approval data element associated with the particular compliance period;

update the first condition and the aggregate completion status in response to a selection of the option by the first user.

16. The non-transitory computer-readable medium of claim 15, wherein each conditions of approval of the plurality of conditions of approval further includes compliance period data identifying a deadline when an associated set of conditions is to be completed, wherein calculating the aggregate completion status of the set of conditions includes identifying the set of conditions to included in an aggregation based at least in part on the compliance period data.

17. The non-transitory computer-readable medium of claim 16, wherein the instructions are further configured to cause the at least one processor to:

identify the one or more other sets of conditions of the one or more other conditions of approval data elements associated with the one or more other compliance periods based on the compliance period data for the one or more other compliance periods, each of the one or more other compliance periods having a compliance period type different than the particular compliance period;

calculate the one or more other aggregate completion statuses by calculating an aggregate completion status for each of the one or more other sets of conditions of the one or more other conditions of approval data elements associated with the one or more other compliance periods; and update the one or more other selectable graphical interface elements representing the one or more other aggregate completion statuses in response to one or more updates to the one or more other aggregate completion statuses determined from re-calculating the one or more other aggregate completion statuses.

18. The non-transitory computer-readable medium of claim 15, wherein the at least one selectable graphical interface element includes a circular dial, wherein calculating the aggregate completion status further includes calculating a percentage of completed conditions from the set of conditions based on one or more updated completion statuses, wherein the second content is further configured to cause the at least one selectable graphical interface element to include shading of a circumferential portion of the circular dial by the percentage.

19. The non-transitory computer-readable medium of claim 15, wherein the at least one selectable graphical interface element includes a user-interactable action that, when activated by user input, is configured to cause to be displayed a conditions list that includes the set of conditions of the particular conditions of approval data element.

20. The non-transitory computer-readable medium of claim 15, wherein calculating the aggregate completion status further includes calculating a first aggregate completion status using a first subset of conditions within the set of conditions that are assigned to a first user identity of the first user and a second aggregate completion status using a second subset of conditions within the set of conditions, wherein the second content is further configured to cause to be displayed the at least one selectable graphical interface element including a first portion representing completed conditions assigned to the first user identity, a second portion representing incomplete conditions assigned to the first user identity, and one or more additional portions representing conditions not assigned to the first user identity.

21. The non-transitory computer-readable medium of claim 15, wherein the instructions are further configured to cause the at least one processor to:

train a machine learning model to identify a subset of pre-configured conditions from a library of pre-configured conditions for potential inclusion in the plurality of conditions of approval data elements for the cloud software planning application; wherein the training uses a historical set of projects as labeled training data to train the machine learning model to score relevance of pre-configured conditions of approval to an input project;

apply project data of the cloud software planning application to the machine learning model, thereby generating a relevance score for each pre-configured condition; and identify a subset of the pre-configured conditions by comparing the generated relevance score against a predetermined threshold.

\* \* \* \* \*

UNITED STATES PATENT AND TRADEMARK OFFICE
CERTIFICATE OF CORRECTION

| | | |
|---|---|---|
| PATENT NO. | : 12,271,845 B2 | Page 1 of 1 |
| APPLICATION NO. | : 17/693045 | |
| DATED | : April 8, 2025 | |
| INVENTOR(S) | : Raghuwanshi et al. | |

It is certified that error appears in the above-identified patent and that said Letters Patent is hereby corrected as shown below:

In the Claims

In Column 31, Line 35, in Claim 2, delete "conditions to" and insert -- conditions --, therefor.

In Column 33, Line 53, in Claim 9, delete "conditions of" and insert -- conditions --, therefor.

In Column 33, Line 54, in Claim 9, delete "conditions of" and insert -- conditions --, therefor.

In Column 34, Lines 66-67, in Claim 15, delete "one two" and insert -- two --, therefor.

Signed and Sealed this
Seventeenth Day of June, 2025

Coke Morgan Stewart
*Acting Director of the United States Patent and Trademark Office*